United States Patent [19]

Furuhata et al.

[11] Patent Number: 4,688,081
[45] Date of Patent: Aug. 18, 1987

[54] APPARATUS FOR CORRECTING TIME BASE ERROR OF VIDEO SIGNAL

[75] Inventors: Takashi Furuhata; Hitoaki Owashi, both of Yokohama, Japan

[73] Assignee: Hitachi, Ltd., Tokyo, Japan

[21] Appl. No.: 821,444

[22] Filed: Jan. 22, 1986

[30] Foreign Application Priority Data

Jan. 25, 1985 [JP] Japan .................................. 60-10866
Jan. 25, 1985 [JP] Japan .................................. 60-10869

[51] Int. Cl.⁴ .............................................. H04N 9/89
[52] U.S. Cl. ...................................... 358/19; 358/326; 358/337
[58] Field of Search .................... 358/17, 19, 148, 150, 358/158, 320, 321, 322, 326, 337, 338, 339

[56] References Cited

U.S. PATENT DOCUMENTS

| 4,165,524 | 8/1979 | Ninomiya | 358/326 |
| 4,249,198 | 2/1981 | Ito | 358/326 |
| 4,373,168 | 2/1983 | Mizukami | 358/19 |
| 4,594,616 | 6/1986 | Dischert | 358/337 |

FOREIGN PATENT DOCUMENTS 58-187078 11/1983 Japan .

OTHER PUBLICATIONS

HD-TV Broadcasting System using Single Channel Satellite, Technical Research Labs of Nak, Ninomiya, pp. 37–42, 3-22-84.

Primary Examiner—Michael A. Masinick
Attorney, Agent, or Firm—Antonelli, Terry & Wands

[57] ABSTRACT

In order to correct a time base error of a video signal reproduced from a video signal recording/reproducing apparatus such as a VTR or the like, when the reproduced video signal is sequentially written into or read out from a memory, a signal which is obtained by frequency multiplying an output of an oscillator for generating a signal of a constant frequency whose phase is momentarily synchronized by a burst signal extracted from the reproduced video signal is used as a write clock. The signal based on the output of the oscillator and the signal based on the output of a reference signal generator for generating a read clock for the memory are phase compared for the vertical blanking period of the reproduced video signal, and a phase difference signal is generated. The oscillating frequency of the oscillator is controlled in a negative feedback manner using this phase difference signal, thereby assuring the stable oscillating frequency which does not cause any frequency deviation. To prevent that erroneous horizontal sync information is used when the burst signal is extracted, the write clock whose phase is synchronized with the reproduced video signal is counted until a predetermined count value and only the normal horizontal sync signal is separated, and also the dropout horizontal sync signal is corrected.

39 Claims, 15 Drawing Figures

APPARATUS FOR CORRECTING TIME BASE ERROR OF VIDEO SIGNAL

BACKGROUND OF THE INVENTION

The present invention relates to an apparatus for correcting a time base error of a video signal and, more particularly, to an apparatus for correcting a time base error of a reproduced video signal which is reproduced from a recording medium.

In magnetic recording/reproducing apparatuses such as a video tape recorder (VTR) or the like, or in video signal reproducing apparatuses or the like such as a video disc player (VDP) or the like, a time base error occurs in the reproduced video signal due to a relative fluctuation in position between a signal detecting medium such as a magnetic head or a pickup head or the like and a recording medium such as a magnetic tape or a disc or the like. When such a time base error is gentle, it causes a phenomenon of a fluctuation (what is called a jitter) in the reproduced image on the display screen. On the contrary, when the time base rapidly changes (in the case of what is called a skew), it causes a phenomenon of a weave or the like. Thus, there is an essential problem such that stability of the reproduced image is remarkably lost.

As a method of correcting the time base error, there has been hitherto known a time base correcting apparatus as shown in FIG. 1, for example, as is also described in the reference, "VRT Technology, Chapter 6", Broadcasting Technology Books, Vol. 5, Nippon Hoso Shuppan Kyokai.

In FIG. 1, reference numeral 10 denotes an input terminal of a video signal having a time base error, and 20 is an output terminal of the video signal whose time base error was corrected. Numeral 1 denotes an A/D converter to convert the input video signal to a digital signal; 2 is a memory consisting of a RAM or the like; and 4 is a horizontal synchronizing signal separator (H-sync separator). The horizontal sync signal having the time base error which is extracted from the H-sync separator 4 is inputted to a write clock generator (W-CLK generator) 40 and a write address controller (WA controller) 70. The W-CLK generator 40 generates a write clock which is in synchronism with the horizontal sync signal and has the time base error of the input video signal. The WA controller 70 outputs a write address by the write clock.

Therefore, the video signal having the time base error which is inputted form the terminal 10 is sequentially converted into the digital signal by the A/D converter 1 synchronously with the write clock outputted from the W-CLK generator 40. This digital signal is stored into the memory 2 in response to the write address from the WA controller 70.

On the other hand, a stable reference synchronizing signal having no time base error is applied from a terminal 30 and a read clock synchronized with this reference sync signal is generated from a read clock generator (R-CLK generator) 90. A read address controller (RA controller) 80 outputs a read address synchronized with the read clock.

Therefore, the data of the video signal stored in the memory 2 is sequentially read out for every horizontal scan period in response to the read address from the RA controller 80. This readout data is sequentially converted to an analog signal by a D/A converter 3 for converting the data to an analog signal in synchronism with the read clock which is outputted from the R-CLK generator 90. Thus, the stable video signal without any time base error is outputted form the terminal 20.

As will be obvious from the above description of the operation, the performance of the time base correcting apparatus depends on the method of generating the write clock from the W-CLK generator 40. It is a significant factor for the apparatus how to generate the write clock which can accurately follow the time base error of the input video signal.

As described in the above-mentioned reference as well, as a conventional example of the write clock generator 40, a system whereby it is constituted by what is called an automatic frequency controller (AFC) shown in FIG. 2 has been well known.

In FIG. 2, the horizontal sync signal from the H-sync separator 4 is inputted to one end of a phase comparator 43 through a terminal 41. A center frequency of a voltage controlled oscillator (VCO) 45 is set to the same frequency as that of the read clock from the R-CLK generator 90 in FIG. 1. An output of the VCO 45 is frequency divided by a divider 46 and the signal of the same frequency as the horizontal scan frequency of the input video signal is outputted from the divider 46. The horizontal sync signal from the terminal 41 and the output from the divider 46 are phase-compared by the phase comparator 43. A difference voltage corresponding to the phase difference between them is outputted form the phase comparator 43 and supplied as a control voltage of the VCO 45 through a phase compensator 44.

What is called an AFC circuit is constituted by the above-mentioned circuits and the output which follows the time base error of the horizontal sync signal of the input video signal is obtained from the VCO 45 due to the negative feedback control operation of the AFC circuit. This output is outputted from a terminal 42 as the write clock.

In this manner, the write clock is produced on the basis of the horizontal sync signal as a conventional method. As disclosed in the above-mentioned reference, the following method has conventionally been well-known as well. Namely, what is called a burst signal (BS) which is added within the horizontal blanking period is used in place of the horizontal sync signal and a negative feedback loop similar to the above is constituted (this circuit is referred to as an APC circuit (automatic phase controller)). Or, both of the AFC circuit based on the horizontal sync signal and the APC circuit based on the burst signal are used and the write clock synchronized with the video signal is produced.

The conventional well-known method of producing the write clock were described above. However, these conventional methods have the following problem since they are based on the negative feedback control. Namely, in the case where the frequency of the time base error is high or the sudden time base error such as a skew occurs, the follow-up errors of the AFC and APC systems essentially occur, so that the time base error is not corrected but remains. On one hand, to increase the correcting capability, a trial to improve the response speeds of the AFC and APC systems is made. However, this method also causes the following problem. The AFC and APC systems also sensitively respond not only to the noise included in the input video signal but also to the sync information erroneously separated and the lack of sync information, so that the systems are contrarily disturbed or the like and the operation becomes remarkably unstable. Further, the high response speeds of the AFC and APC systems cause the systems to be deviated from the pull-in range when an amount of time base error increases, so that there is a problem such that the time base cannot be corrected any more, or the like.

SUMMARY OF THE INVENTION

It is an object of the present invention to provide an apparatus for correcting a time base error in which any time base errors can be stably and certainly removed without being influenced by noise included in the video signal.

Another object of the invention is to provide an apparatus for correcting a time base in which when the sync information is extracted from the video signal, the signal erroneously separated together with the sync information due to the noise or the like is removed, and further the dropout sync information is compensated, thereby making it possible to separate and output only the normal sync information and to certainly correct the time base error.

Still another object of the invention is to provide circuits for separating and correcting sync information in a circuit to extract the sync information from the reproduced video signal from a recording medium, in which the signal erroneously separated together with the sync information due to the noise is removed and further the dropout sync information is compensated, thereby making it possible to separate and output only the normal sync information and to compensate the dropout sync information.

To accomplish the above objects, according to the present invention, an oscillating output of a constant frequency whose phase is momentarily synchronized with the burst signal multiplexed to the video signal is outputed from an oscillator. This output is frequency multiplied to obtain a sampling clock and a memory write clock of the video signal. Also, the signal based on that oscillating output and the signal based on an output of a generator for generating a reference signal of a predetermined frequency are phase compared for the vertical blanking period of the video signal, and a phase difference signal is generated. An oscillating frequency of the oscillator is controlled by this phase difference signal.

Further, according to the invention, only a normal horizontal sync signal is separated by using means for counting the write clock whose phase is synchronized with the video signal and gate means for passing the horizontal sync signal extracted from the video signal when a count value of the counting means becomes a predetermined value, and the normal horizontal sync signal is used for extracting the burst signal.

Namely, the invention intends to provide an apparatus having a memory into which and from which the writing and readout can be sequentially performed, in which a video signal is sampled in the direction of time base and sequentially written into this memory and also the stored video signal is sequentially read out from the memory, and thereby correcting the time base of the video signal. This time base correcting apparatus is characterized by having: means for separating a burst signal multiplexed to the video signal; oscillating means which starts oscillating by receiving the separated burst signal and which continues the oscillation during the interval when the separated burst signal does not exist; phase comparing means for generating a phase difference signal by phase comparing the signal based on an output of the oscillating means with the signal based on an output of reference signal generating means for generating a read clock for the memory; and means for controlling an oscillating frequency of the oscillating means in a negative feedback manner using the phase difference signal for the vertical blanking period of the video signal, wherein the signal based on the output of the oscillating means is used as a write clock for the memory. In addition, means for separating a normal horizontal sync signal, which includes means for counting the signal based on the output of the oscillating means and gate means which is opened when a count value of this counting means becomes a predetermined value, is arranged in front of the means for separating the burst signal. By using the normal horizontal sync signal outputted from this gate means, the oscillating output whose phase is momentarily synchronized with only the normal horizontal sync information extracted from the video signal is obtained, and this oscillating output is used as the write clock for the memory. Further, according to the invention, in the case of occurrence of the dropout of the normal horizontal sync information, a correction signal is outputted when the count value of the counting means becomes another predetermined value, and this correction signal is used as the horizontal sync signal.

DESCRIPTION OF THE PREFERRED EMBODIMENTS

Figure 3:
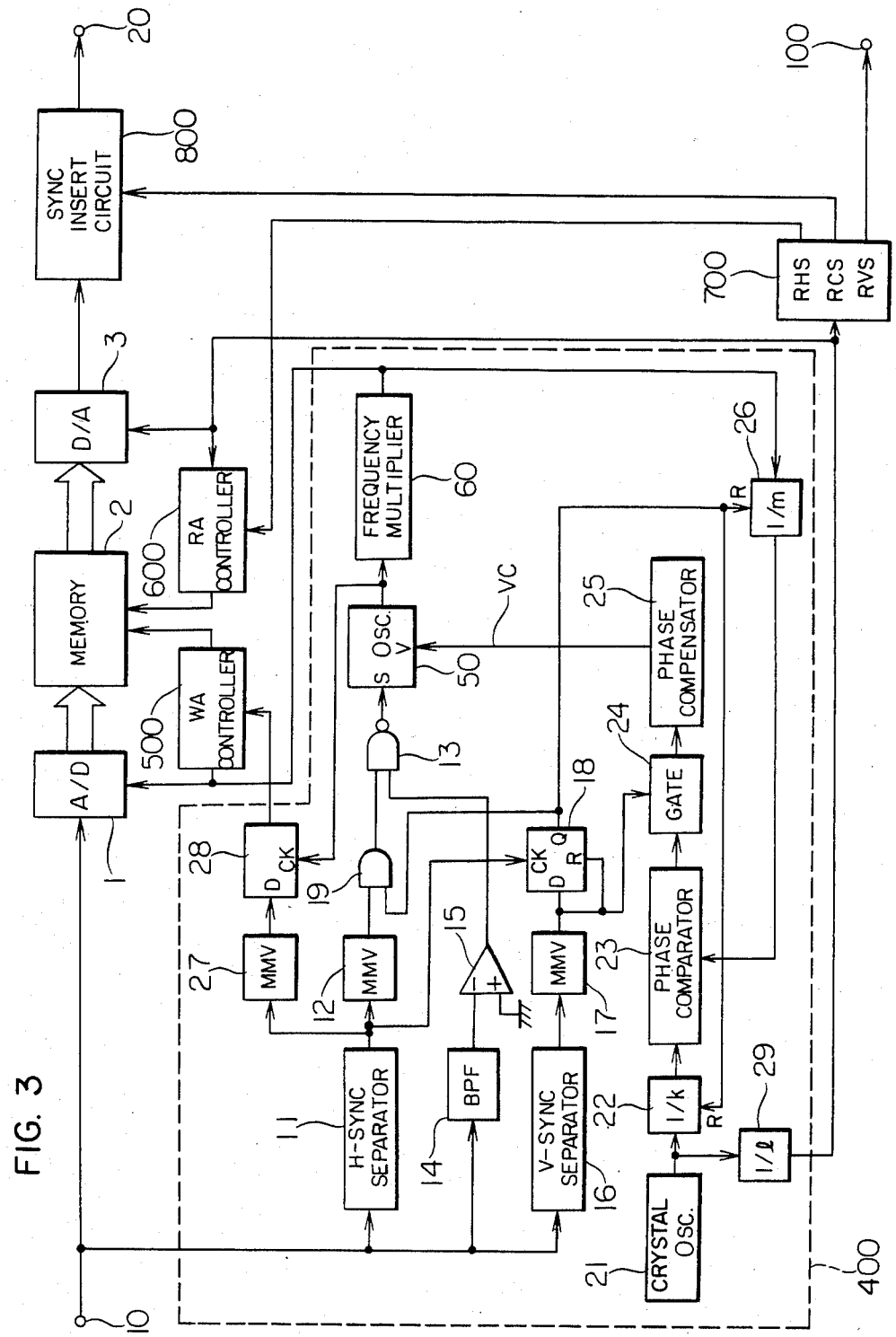
FIG. 3 is a block diagram showing an embodiment of an apparatus for correcting a time base of a video signal according to the present invention.
Figure 4:
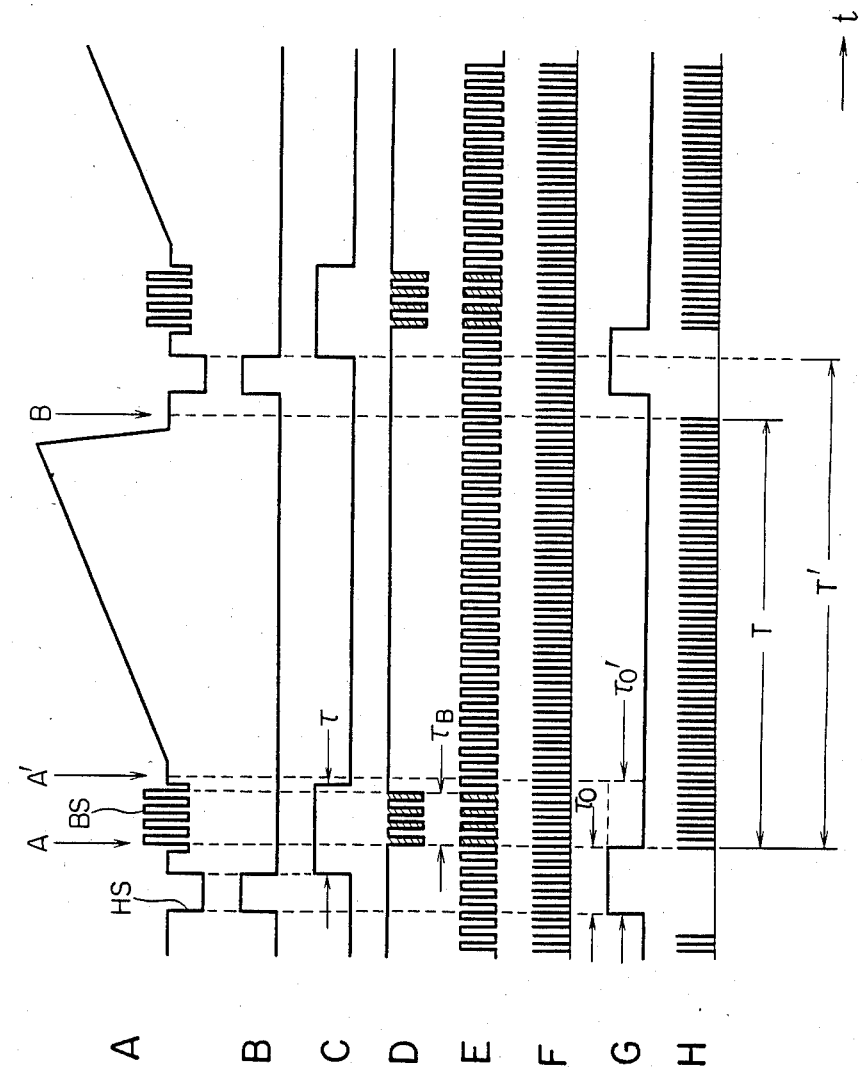
FIG. 4, A to H, is a waveform diagram showing operation waveforms in the main part of the time base correcting apparatus of FIG. 3.
Figure 5:
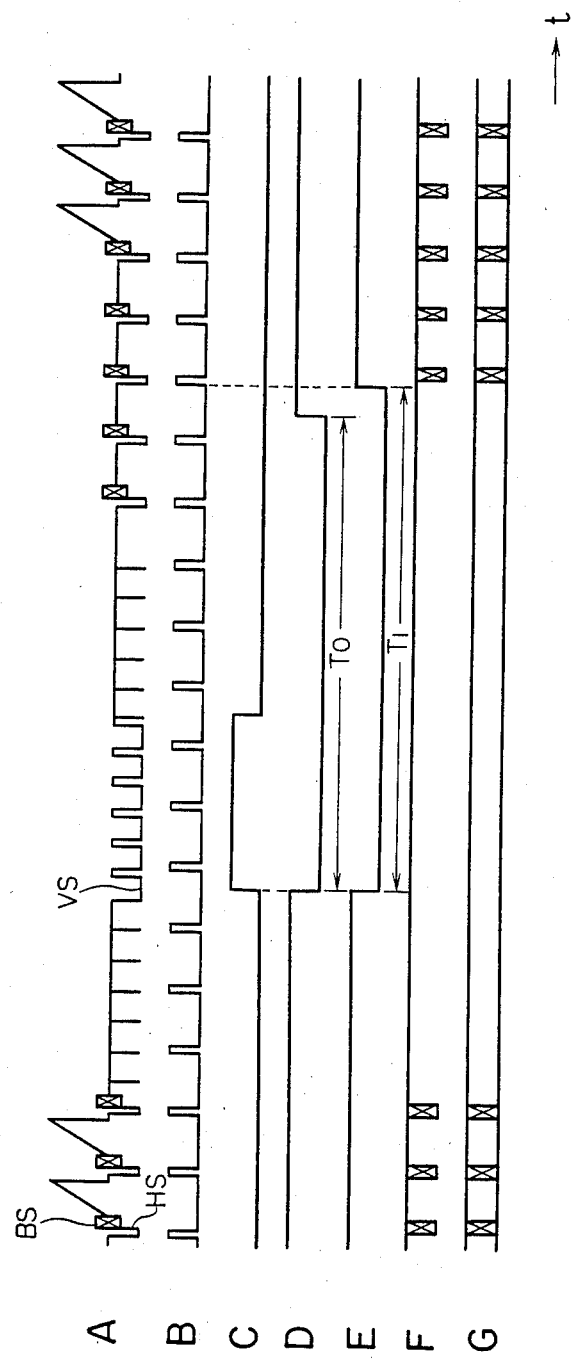
FIG. 5, A to G, is also a waveform diagram showing waveforms near the vertical blanking period among the operation waveforms in the main part of the time base correcting apparatus of FIG. 3.

The present invention will now be described in detail hereinbelow with respect to an embodiment. FIG. 3 is a block diagram showing an embodiment of an apparatus for correcting a time base error according to the present invention. FIG. 4, A to H, and FIG. 5, A to G, are waveform diagrams for explaining the operation of this time base correcting apparatus. FIG. 4, A to H shows a part of the horizontal scan period of an input video signal. FIG. 5, A to G, shows a part of the vertical blanking period of the input video signal.

Figure 1:
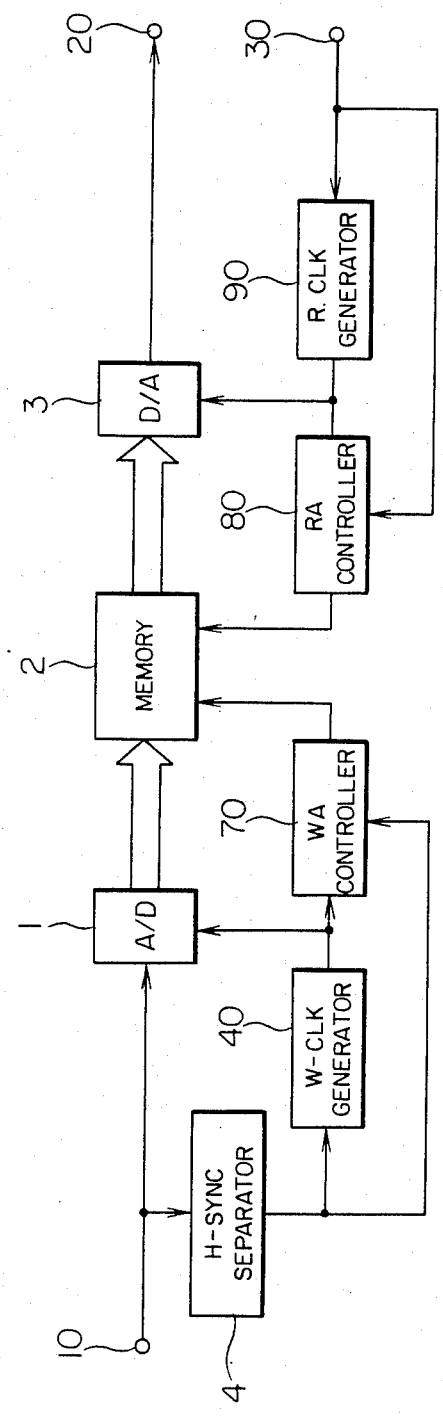
FIG. 1 is a block diagram of a conventional apparatus for correcting a time base of a video signal.
Figure 2:
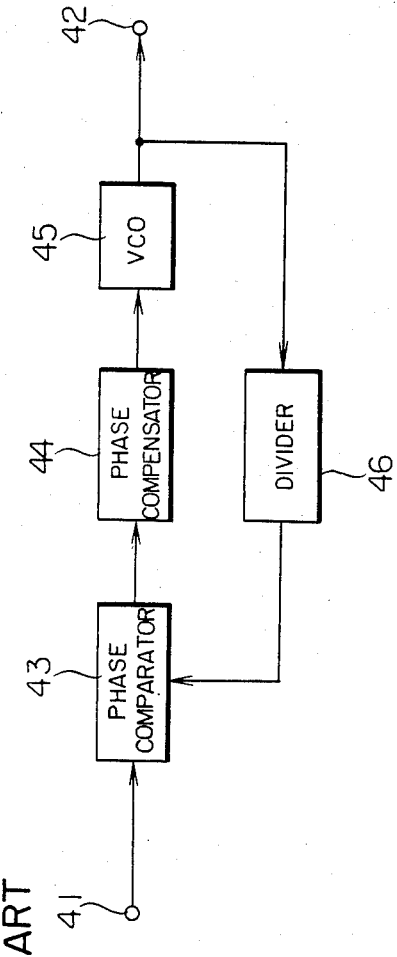
FIG. 2 is a block diagram showing a practical arrangement of a W-CLK genrator in FIG. 1.

In FIG. 2, the A/D converter 1, memory 2, and D/A converter 3 are the same as those in the conventional example shown in FIG. 2 and are designated by the same reference numerals. In addition, reference numeral 400 denotes a write clock (W-CLK) genrator as the main part of the embodiment; 500 is a write address (WA) controller; 600 a read address (RA) generator; and 700 a reference synchronizing signal (RSS) generator. The W-CLK generator 400 also includes a sync-separator.

The constitution and operation of the W-CLK generator 400 will be described with reference to the waveform diagrams of FIG. 4, A to H, and FIG. 5, A to G. The horizontal sync signal (HS in FIG. 4, A, and HS in FIG. 5, A) included in the input video signal (FIG. 4, A, and FIG. 5, A) from the terminal 10 is separated from this input video signal and outputted by a horizontal synchronizing (H-sync) separator 11. A particularly suitable circuit as the H-sync separator 11 will be described later in detail. A monostable multivibrator (MMV) 12 is triggered in response to the trailing edge of an output (FIG. 4, B) from the separator 11, so that a gate pulse (FIG. 4, C) of a predetermined time width $\tau$ is outputted. Numeral 14 denotes a band-pass filter (BPF), by which a burst signal (BS in FIG. 4, A, and BS in FIG. 5, A) of a frequency of $f_0$ included in the video signal from the terminal 10 is separated from this video signal and outputted. The output from the BPF 14 is sufficiently amplified by a limiter 15 and thereafter it is supplied to one input terminal of a NAND gate 13. A gate pulse from the MMV 12 is supplied to the other input terminal of the NAND gate 13 through an AND gate 19. As will be explained later, the AND gate 19 is open for the period excluding the vertical blanking period (period indicated by $T_1$ in FIG. 5, E), so that the gate pulse from the MMV 12 is inputted to the NAND gate 13. An output from the limiter 15 is gated by this gate pulse and only the burst pulse (FIG. 4, D, and FIG. 5, F) based on the burst signal BS is outputted from the NAND gate 13. This burst pulse is supplied as a signal to instruct the start of oscillation of an oscillator 50 to its terminal S. A control voltage VC, which will be explained later, is supplied to the other terminal V of the oscillator 50. The oscillating frequency of the oscillator 50 is varied by the control voltage VC and the phase to start the oscillation is instantaneously determined by the burst pulse. A practical constitution of the oscillator 50 will be described in detail later with reference to FIG. 6.

In this embodiment, the oscillating frequency of the oscillator 50 is set to the same frequecy $f_0$ as that of the burst signal. An output from the oscillator 50 (FIG. 4, E) is supplied to a frequency multiplier 60. When the video signal which is inputted to the terminal 10 is sampled and digitized in the direction of time base in accordance with the band of this video signal, the frequency of the output from the oscillator 50 is multiplied with n by the frequency multiplier 60 so as to obtain a sampling clock of a high frequency which is necessary and enough to prevent the generation of spurious due to what is called a fold. As an example of a numerical value of n, for example, like an NTSC signal, in the case where the input video signal is such that a chrominance signal is quadrature multiplexed by a chrominance subcarrier of a frequency $f_{sc}$ and is frequency multiplied together with a luminance signal and that the frequency $f_0$ of the burst signal is equal to the frequency $f_{sc}$ of the chrominance subcarrier ($f_0=f_{sc}$), $3f_{sc}$ is sufficient as the frequency of the sampling clock. Therefore, n is set to 3 in this case and the frequecy of the output from the oscillator 50 is tripled by the frequency multiplier 60. In this invention, the value of n may be set to an arbitrary value as necessary.

Figure 6:
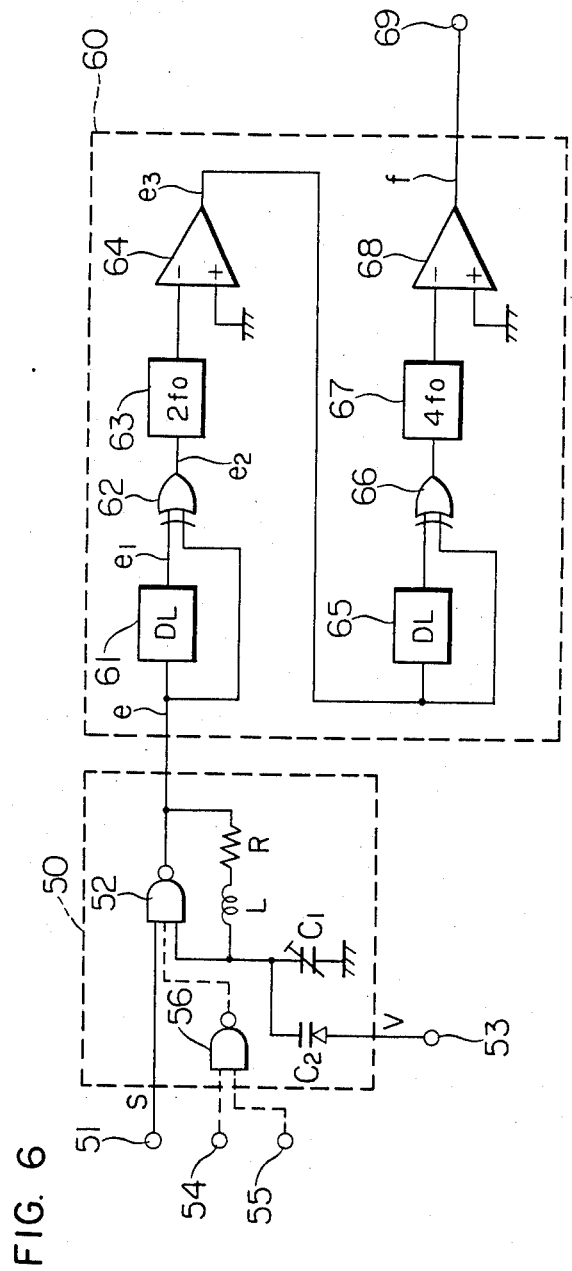
FIG. 6 is a circuit diagram showing practical embodiments of an oscillator 50 and a frequency multiplier 60 in the time base correcting apparatus of FIG. 3.
Figure 7:
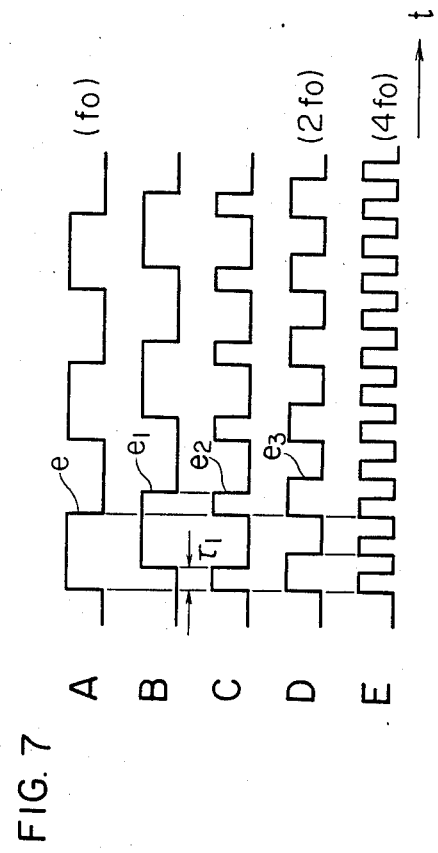
FIG. 7, A to E, is a waveform diagram showing operation waveforms in the main part in FIG. 6.

FIG. 6 shows more practical embodiments of the oscillator 50 and frequency multiplier 60 and FIG. 7, A to E, shows a waveform diagram of the main part thereof. The embodiments of FIG. 6 show the case where the value of n of the frequency multiplier 60 is 4.

In the oscillator 50, the burst pulse (FIG. 4, D) from the NAND gate 13 in FIG. 3 is supplied through a terminal 51 to one input of a NAND gate 52 having two inputs. An output of the gate 52 is connected to the other input of the gate 52 through a resistor R and an inductance L and this input is also grounded by a capacitor $C_1$ and a variable capacitor $C_2$ in an AC manner. The oscillator is constituted by those R, L, $C_1$, and $C_2$ and its oscillating frequency is determined by the resistance value of R, inductance value of L, and capacitance values of $C_1$ and $C_2$. In this embodiment, those values of R, L, C, and $C_2$ are decided so that the oscillating frequency equals the frequency $f_0$ of the burst signal. The capacitance value of the variable capacitor $C_2$ is varied in response to the control voltage VC from a terminal 53. It is not always necessary to use the resistor R in the oscillator 50.

The burst pulse from the terminal 51 becomes a low level "L" only for the period (period indicated by the hatched portions in FIG. 4, D) of the half burst cycle of the period $\tau_B$ of the burst signal which is included in the input video signal and becomes a high level "H" for the other period. Therefore, as the output from the NAND gate 52, as shown in FIG. 4, E, the output (output indicated by the hatched portions in FIG. 4, E) which is completely synchronized with the burst pulse (therefore, the burst signal BS of the video signal) is obtained for the period $\tau_B$ of the burst signal. Since the burst pulse becomes a high level "H" for the period after the period $\tau_B$, the NAND gate 52 is open and the oscillation is started and continued until the next burst pulse is inputted, so that the continuous oscillating output is derived from the NAND gate 52.

In the oscillator 50 in FIG. 6, as shown by the signal path indicated by broken lines, the output pulse from the H-sync separator 11 is inputted to one input terminal of a NAND gate 56 through a terminal 54 and an output of a latch circuit 18, which will be explained hereinafter, is inputted to the other input terminal of the NAND gate 56 through a terminal 55, and an output of the NAND gate 52 is supplied to the third input of the NAND gate 56. Due to this, the oscillation of the oscillator 50 may be temporarily stopped for the period excluding the vertical blanking period $T_1$ by the output pulse from the H-sync separator 11. This constitution presents an effect such that the phase synchronization to start the oscillation of the oscillator 50 by the burst pulse can be more certainly performed.

As will be obvious from the above description of the operation, the oscillating output whose phase is momentarily synchronized with the burst pulse, namely, with the burst signal corresponding to the synchronizing information included in the input video signal and which has the same frequency $f_0$ as that of the burst signal is continuously obtained from the oscillator 50 without being momentarily interrupted.

The output (FIG. 4, E, and e in FIG. 7, A) from the oscillator 50 is inputted to the frequency multiplier 60. In FIG. 6, reference numeral 61 denotes a delay circuit and 62 is an exclusive OR gate (EOR) and a delay time $\tau_1$ ($\tau_1$ of $e_1$ in FIG. 7, B) of the delay circuit (DL) 61 is determined so that $\tau_1 < \frac{1}{2}f_0$ for the frequency $f_0$ of the output from the oscillator 50. As shown by $e_2$ in FIG. 7, C, a pulse of a pulse width $\tau_1$ is produced from both leading and trailing edges of the output from the oscillator 50 and is outputted from the EOR 62. The component of a frequency $2f_0$ is separated from the output from the EOR 62 by a tank circuit 63 of a resonance frequency $2f_0$. An output of the tank circuit 63 is sufficiently amplified by a limiter 64 and shaped to a square wave ($e_3$ in FIG. 7, D) of a duty ratio of 50%. Thus, the signal of which the frequency of the output from the oscillator 50 was doubled is obtained from the limiter 64. Similarly, a delay circuit 65 and an EOR 66 are provided and a delay time $\tau_2$ of the delay circuit 65 is determined so that $\tau_2 < \frac{1}{4}f_0$. Numeral 67 denotes a tank circuit having a resonance frequency $4f_0$ and 68 is a limiter. The above circuits operate in a manner similar to the above and the signal (FIG. 7, E) of a square wave having a duty ratio of 50% of the frequency $4f_0$ of which the frequency of the output from the limiter 64 was doubled is outputted from the limiter 68. An output from the limiter 68 is outputted to a terminal 69 as a write clock.

Since the output (FIG. 4, F, and FIG. 7, E) from the frequency multiplier 60 is phase synchronized with the output (FIG. 4, E, and FIG. 7, A) from the oscillator 50, the write clock whose phase is momentarily synchronized with the burst pulse, namely, with the burst signal BS included in the input video signal and which has the frequency ($4f_0$) of four times as high as the frequency of the burst signal BS is continuously obtained from the output terminal 69 without being momentarily interrupted. In FIG. 4, F and H, the signals having the accurate frequency ($4f_0$) are not shown for convenience of drawing.

As described above, the write clock is produced such that its phase is momentarily synchronized with the sync information (burst signal) included in the input video signal, so that the time base error due to the sampling digitization does not occur. In addition, it is possible to stably and accurately obtain the write clock which almost completely follows the time base error which is included in the input video signal without being influenced by this time base error. On one hand, since the phase to start the oscillation of the oscillator 50 is determined by, so to speak, the average phase of the burst signal having the above-mentioned plurality of cycles, there is an effect such that such if the S/N ratio of the input video signal deteriorates and the noise-like phase variation occurs in the burst signal, its influence can be remarkably reduced due to the time averaging effect.

Returning to FIG. 3, reference numeral 16 denotes a vertical synchronizing signal separator (V-sync separator); 17 is a monostable multivibrator (MMV); 18 the latch circuit; 19 the AND gate; 21 a crystal oscillator; 22 a divider of 1/k (k is an integer of 1 or more); 23 a phase comparator; 24 a gate circuit; 25 a phase compensator; and 26 a divider of 1/m (m is an integer of 1 or more). The vertical sync information (VS in FIG. 5, A) in the input video signal is separated by the V-sync separator 16 and outputted (FIG. 5, C). The MMV 17 is triggered by an output from the V-sync separator 16 and an output (FIG. 5, D) of a pulse width of a predetermined time $T_0$ based on the vertical blanking period of the input video signal is derived from the MMV 17. An output from the MMV 17 becomes a signal which, so to speak, detects the vertical blanking period of the input video signal. The output from the MMV 17 is supplied to a data input D and a reset input R of the latch circuit 18. The latch circuit 18 is reset for the period of $T_0$ and its output Q becomes a low level "L". The output from the H-sync separator 11 is supplied to a clock input CK of the latch circuit 18. The latch circuit 18 is triggered by (the leading edge of) the output pulse which is first outputted after the period of $T_0$ and its output Q becomes a high level "H". The output Q of the latch circuit 18 is held at a low level "L" for a predetermined period of $T_1$ ($>T_0$) as shown in FIG. 5, E. The gate pulse from the MMV 12 is gated by the AND gate 19 by the output from the latch circuit 18. Thus, this gate pulse is inhibited for the period of $T_1$ and an output of the AND gate 19 becomes "L" and an output of the NAND gate 13 becomes "H", so that the burst pulse is not supplied to the oscillator 50 for the period of $T_1$. An output waveform of the burst pulse as the output from the NAND gate 13 is shown in FIG. 5, F.

The burst pulse from the NAND gate 13 is inputted to the terminal S of the oscillator 50 and the oscillating output (FIG. 5, G) synchronized with the burst pulse is obtained as mentioned above. However, for the period of $T_0$ corresponding to the vertical blanking period, the oscillating output synchronized by the burst pulse (FIG. 5, F) immediately before this period is derived.

The embodiment is characterized in that the oscillating output is phase synchronized with the external stable oscillating output by what is called a phase locked loop (PLL) circuit for the vertical blanking period of $T_0$ and the stable oscillating frequency which does not cause any frequency deviation is certainly obtained. Namely, a reference signal of a stable frequency is obtained by the crystal oscillator 21 and the PLL circuit is constituted by a group of circuits 22, 23, 24, 25, 50, 60, and 26. The oscillating output from the oscillator 50 is phase synchronized with the reference signal from the crystal oscillator 21 serving as the reference signal generator for the period of $T_0$.

An output from the crystal oscillator 21 is properly divided into 1/k by the divider 22 and the divided output is supplied to one input terminal of the phase comparator 23. The oscillating output from the oscillator 50 is frequency multiplied with n by the frequency multiplier 60. Thereafter, it is properly divided into 1/m by the divider 26 and the divided output is supplied to the other input terminal of the phase comparator 23. The output Q from the latch circuit 18 is supplied to respective reset inputs R of the dividers 22 and 26. The dividers 22 and 26 are reset for the period other than $T_1$ and their resettings are canceled for only the period of $T_1$ and the normal dividing oprations are executed. The outputs from the dividers 22 and 26 are phase compared by the phase comparator 23 and a phase difference signal corresponding to the phase difference therebetween is outputted form the comparator 23. The gate circuit 24 gates the output from the phase comparator 23 by the output from the MMV 17 for only the vertical blanking period $T_0$ and supplies the gated signal to the phase compenstor 25. The gate circuit 24, on the contrary, is turned off for the period other than $T_0$ and the supply of the output from the phase comparator 23 to the phase compensator 25 is stopped, and at the same time an output impedance of the gate circuit 24 sufficiently increases. Thus, the phase difference signal from the comparator 23 is supplied to the compensator 25 through the gate circuit 24 for only the vertical blanking period of $T_0$. This phase difference signal is held in the compensator 25 for the period other than $T_0$. The phase compensator 25 is constituted by an integrator (practically speaking, a first-order lag circuit) or the like. The phase difference signal is sufficiently smoothed by the compensator 25 and the characteristic of the foregoing PLL circuit is compensated so as to become sufficiently stable. The output of the compensator 25 is inputted as the control voltage VC to the voltage control input terminal V of the oscillator 50.

The oscillating output of the oscillator 50 is phase synchronized with the stable reference signal from the crystal oscillator 21 by the PLL negative feedback control which is constituted as described above. The oscillating frequency $F_0$ of this oscillating output is given by the following expression assuming that a frequency of the reference signal is $f_1$.

$$f_0 = f_1 \times m/k \times 1/n \quad (1)$$

By properly setting values of m, k, n, and $f_1$, a desired oscillating frequency $f_0$ can be obtained. This oscillating frequency $f_0$ does not cause a frequency deviation for a desired value by the PLL negative feedback control. Also, the oscillating output whose phase is momentarily synchronized with the video information can be derived for the period including the video information other than the vertical blanking period $T_0$. On one hand, different from the conventional AFC and APC systems of the follow-up control type which have already been described in conjunction with FIG. 2, the constant value control systems in which the reference signal is constant are constituted and also the phase distance between the reference signal ($f_1$) and the oscillating output ($f_0$) for phase synchronization can be reduced, so that an amount of phase deviation at the time of the phase pullin can be reduced. Therefore, a high response speed of the system can be derived and the phase variation of the oscillating output is difficult to occur. Even if the phase variation occurs, it is very small. Further, since the phase of the oscillating output is momentarily synchronized with the sync information which is included in the input video signal, its influence is remarkably decreased.

In the embodiment of FIG. 2, in place of supplying the output of the frequency multiplier 60 to the divider 26, the output of the oscillator 50 may be supplied to the divider 26 (although not shown). In this case, the relation between the frequency $f_1$ of the reference signal and the oscillating frequency $f_0$ is given by the following expression.

$$f_0 = f_1 \times m/k \quad (2)$$

In this case as well, an effect similar to the above can be obtained and this constitution is also incorporated in the spirit of the present invention.

Although the case where the dividers 22 and 26 are reset by the output from the latch circuit 18 has been shown, this resetting may be omitted and even in this constitution, it is also included in the essence of the invention. However, by resetting the dividers 22 and 26 in a manner similar to the case of the embodiment, the dividers 22 and 26 can be uniformly initialized at every opration period of the PLL system at the time of the pull-in of the PLL system. Consequently, there are effects such that the system is hardly disturbed and the pull-in can be always stably and promptly performed. In addition, the latch circuit 18 is omitted and the output from the MMV 17 may be supplied to a group of circuits 19, 26, and 22. However, as shown in the embodiment, the latch circuit 18 is provided and the reset of the dividers 22 and 26 is cancelled for the vertical blanking period of $T_1$ of which the vertical blanking period of $T_0$ was extended with respect to the time, and also the AND gate 19 is closed. Due to this, there are effects such that it is possible to prevent the unnecessary phase difference signal from being supplied and held in the phase compensator 25 and the operation of the PLL system can be further stabilized.

Thus, the continuous clock output can be derived from the frequency multiplier 60 without being momentarily interrupted as mentioned above. The output from the multiplier 60 is used as the sampling clock of the input video signal and as the write clock for the memory 2. The input video signal from the terminal 10 is sequentially sampled and converted into the digital signal by the A/D converter 1 in response to the output clock from the frequency multiplier 60.

A frequency $f_w$ of the write clock as the output from the multiplir 60 is given by the following expression.

$$f_w = n \times f_0 = m/k \times f_1 \quad (3)$$

Referring again to FIG. 3, reference numeral 27 denotes a monostable multivibrator (MMV) and 28 is a latch circuit. The MMV 27 is triggered by (the leading edge of) the output from the H-sync separator 11 and a pulse (FIG. 4, G) of a predetermined time width $\tau_0$ is outputed from the MMV 27. An output from the MMV 27 is synchronized by the output from the oscillator 50 by the latch circuit 28. Due to this synchronization of the latch circuit 28, even if a phase variation occurs in the output pulse from the H-sync separator 11 due to the noise or the like which is added to the horizontal sync signal HS, this phase variation is removed, so that the output whose phase is completely synchronized with the output from the oscillator 50 is derived from the latch circuit 28. The output from the latch circuit 28 is supplied to the write address (WA) controller 500 as the write start pulse for the memory 2. Although not described in detail, the WA controller 500 is constituted by a counter and the like and starts counting by the write start pulse from the latch circuit 28. When a predetermined number of clock pulses from the frequency multiplier 60 (or clock pulses from the oscillator 50, although not shown in the diagram) are counted, an address signal corresponding to this count value is outputted and supplied as the write address signal for the memory 2 for only the time period of T (T in FIG. 4, H). On one hand, this address signal is sequentially updated at every horizontal scan period by the write start pulse from the latch circuit 28. Therefore, the output from the A/D converter 1 is sequentially written into the memory 2 on the basis of the unit of the horizontal scan period.

Values of $\tau_0$ and T are set such that both of the write start point (A in FIG. 4, A) and the write end point (B in FIG. 4, A) into the memory 2 at every horizontal scan period are included in the horizontal blanking period of the input video signal. Therefore, only the necessary and sufficient amount of video information of the input video signal can be stored into the memory, in other words, there is an effect such that the capacity of the memory 2 can be reduced.

Next, the reference clock from the crystal oscillator 21 is divided into 1/l (l is an integer of 1 or more) by a divider 29. The divided output is supplied as the read clock to the read address (RA) controller 600 and D/A converter 3 and is also supplied to the reference synchronizing signal (RSS) generator 700. A frequency $f_R$ of the read clock from the divider 29 is given by the following expression.

$$f_R = 1/l \times f_1 \qquad (4)$$

By setting the values of k, l, and m so as to obtian l=k/m from expressions (4) and (3), the frequency ($f_R$) of the read clock from the divider 29 equals the frequency ($f_W$) of the write clock from the frequency multiplier 60. The clock from the divider 29 is properly divided by the RSS generator 700, so that a reference sync signal RCS of the same format and same frequency as those of the sync signal of the input video signal, a read start pulse RHS, and a reference vertical sync signal RVS are produced.

The RA controller 600 is constituted by a counter and the like in a manner similar to the WA controller 500 and starts counting by the read start pulse RHS from the RSS generator 700 at every horizontal scan period. Thereafter, a predetermined number of clocks from the divider 29 are counted and an address signal corresponding to the count value is outputted and supplied as a read address signal for the memory 2 for only the period of T.

The address signal is sequentially updated at every horizontal scan period by the read start pulse RHS from the RSS generator 700. Thus, the video information stored in the memory 2 is sequentially read out therefrom on the basis of the unit of the horizontal scan period and the output is converted into the analog signal by the D/A converter 3.

As will be obvious from the above operation, both of the write address signal from the WA controller 500 and the read address signal from the RA controller 600 are outputted for only the period of T excluding the horizontal blanking period of the input video signal. Therefore, the horizontal blanking and synchronizing signals are not included in the outputs from the memory 2 and D/A converter 3. Therefore, to recover the signal format similar to the input video signal, the reference sync signal RCS from the RSS generator 700 is added to the output from the D/A converter 3 by a synchronizing signal insert circuit (sync insert circuit) 800.

The reference vertical sync signal RVS from the RSS generator 700 is outputted as a reference signal of a servo control apparatus (not shown) through a terminal 100.

In the magnetic recording/reproducing apparatus such as a VTR or the like or the video signal reproducing apparatus such as a video disc player or the like to which the time base correcting apparatus based on the embodiment of FIG. 3 is applied, the above-mentioned servo control apparatus is constituted by a tracking control system to accurately reproduce the signal by controlling the relative phases of the signal detecting means such as a magnetic head or a pickup head or the like and the recording medium such as a magnetic tape or an optical disc or the like, and the like and the conventionally well-known apparatus is used as the serve control apparatus.

The reference vertical sync signal RVS from the output terminal 100 is inputted to the servo control apparatus, so that the input video signal from the terminal 10 is serve controlled so that its phase is synchronized with this reference vertical sync signal. Further practically speaking, the input video signal is servo controlled so as to be phase synchronized in the state such that the phase of the reference vertical sync signal is time-delayed than the phase of the vertical sync signal of the input video signal.

Due to this servo control, the writing operation into the memory 2 is time-precedent to the reading operation. Thus, the video information stored in the memory 2 is not dropped out but is all accurately read out on the basis of the stable time base without any error. On the other hand, the blanking and synchronizing information deleted upon writing into the memory 2 is compensated by the reference sync signal RCS of the same stable time base as that in the case of the reading operation by the sync insert circuit 800. Therefore, the stable video signal of which the time base error of the input video signal was removed is accurately reproduced and outputted from the terminal 20.

In addition, as mentioned above, the PLL control is performed so that the frequency ($f_W$) of the write clock equals the frequency ($f_R$) of the read clock, so that only the time base error component of the input video signal is removed and the graphic distortion due to compression and expansion of the time base in the writing and reading operations does not occur. Further, since the write clock is produced so as to be momentarily synchronized with the sync information of the input video signal, even when the sudden time base error such as a skew occurs, the W-CLK generator 400 is not disturbed by this sudden time base error and it is possible to stably obtain the write clock which accurately follows any time base error.

In the embodiment, the case where the time base is corrected for only the video information period (T) excluding the horizontal blanking period has been shown. However, according to the invention, the continuous write clock can be obtained without being momentarily interrupted for the horizontal blanking period as well. Therefore, for example, if the WA controller 500 and RA controller 600 count the clocks for the period of T' as shown in FIG. 4, H, and the horizontal sync signal HS is included for the period of T', or if the write start position which is determined by the delay time of the MMV 27 is set so as to include the horizontal sync signal HS, both of the video information and the sync signal can be together time base corrected. Therefore, in this case, the sync insert circuit 800 can be omitted.

In addition, in the embodiment, the case where the conventional horizontal sync information (horizontal sync signal and burst signal) of the horizontal scan unit and the vertical sync information (vertical sync signal) of the vertical scan unit are used as the sync information of the video signal has been shown in the diagrams. However, the invention is not limited to this case.

Figure 8:
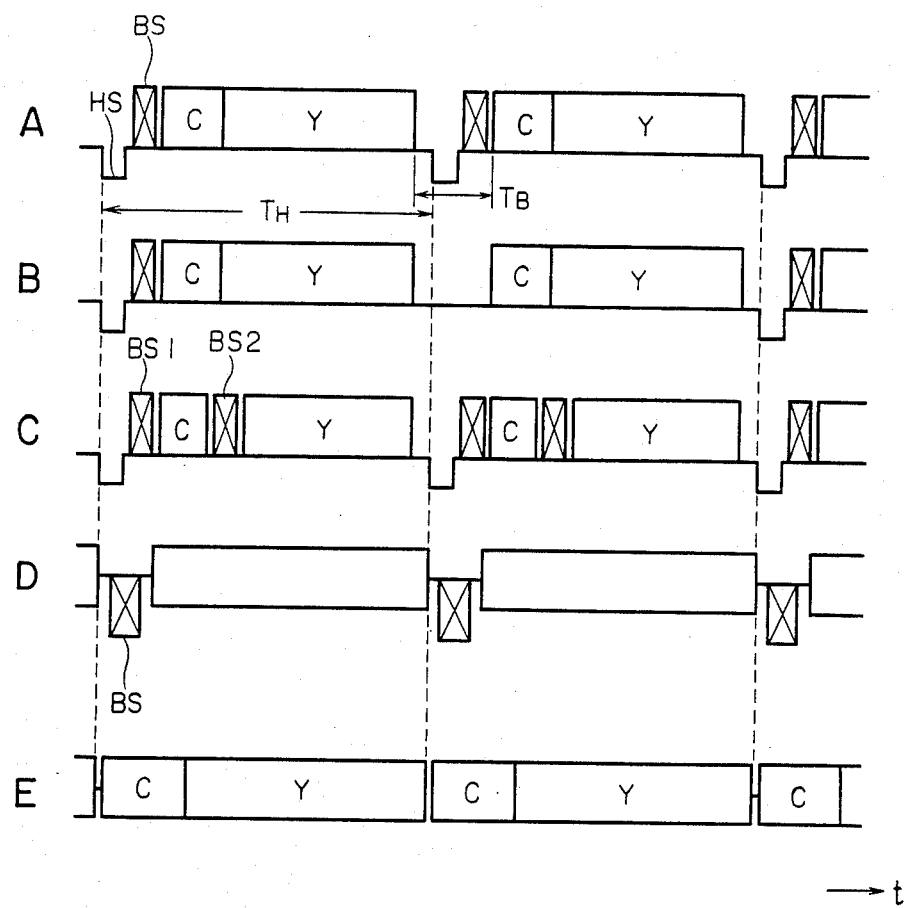
FIG. 8, A to E, is a waveform diagram showing examples of waveforms of a video signal which is corrected by the time base correcting apparatus of the invention.

For example, the invention can be also applied to the case where the sync information separately multiplexed to a part of the horizontal blanking period of $T_B$ as shown in FIG. 8, A, is used in place of the conventional sync signal. The invention can be similarly applied to the case where, as shown in FIG. 8, A, luminance information Y and chrominance information C are time-division multiplexed by allocating a set of horizontal sync information (horizontal sync signal HS and burst signal BS) for one horizontal scan period $T_H$. The invention can be also applied to the following cases. The case where a set of horizontal sync information (HS and BS) is assigned for a plurality of (e.g., two) horizontal scan periods as shown in FIG. 8, B. The case where a plurality of sync information (for example, as shown in FIG. 8, C, a burst signal $BS_1$ for the chrominance information C and a burst signal $BS_2$ for the luminance information Y) are assigned for one horizontal scan period and the time base correction similar to the above is performed in accordance with the respective sync information ($BS_1$ and $BS_2$). The case where, as shown in FIG. 8, D, only the burst signal BS is assigned as the horizontal sync information without assigning the horizontl sync signal. The case where only the vertical blanking period is included and the vertical sync information is not particularly assigned, although not shown. And there are other cases. Any of those cases does not depart from the spirit of the present invention and the similar effect is derived.

On the other hand, in the embodiment, the case where the time base is corrected so that the frequency ($f_W$) of the write clock equals the frequency ($f_R$) of the read clock has been shown. However, the invention is not limited to this case. In the case where the frequencies of the write clock and read clock differ (namely, when 1≠k/m), in addition to the removal of the time base error as an object of the present invention, the time base of the input video signal can be compressed or expanded. Thus, there is an effect such that the function as the time base converting apparatus of the video signal can be easily realized without increasing the circuit scale. As an example of this time base converting apparatus, as a part of, e.g., high precision video signals has been proposed, in the case where the original video signal has a signal format which, in particular, does not have the horizontal sync signal HS or burst signal BS as shown in FIG. 8, E, in the abovementioned magnetic recording/reproducing apparatus such as a VTR or the like or video signal reproducing apparatus such as a video disc player or the like, and the like, the original video signal (FIG. 8, E) is preliminarily time base compressed (a compressibility in this case assumes X) and the horizontal sync signal HS and burst signal BS are properly inserted for the blanking period (period of $T_B$ shown in FIG. 8, A) of the video signal derived due to the compression and thereafter those signals are recorded on the recording medium of the above-mentioned apparatus (the compressibility X is given by the expression $X = 1 - T_B/T_H$). Upon reproduction, when the reproduced video signal from the recording medium of the apparatus is processed by the time base correcting apparatus shown in the embodiment of FIG. 3 according to the present invention, by properly setting the values of k, 1, and m such that the ratio of the frequency ($f_R$) of the read clock to the frequency ($f_W$) of the write clock satisfies the expression $$f_R/f_W = 1/l \times k/m = X \qquad (5)$$

for the compressibility X, the time base error of the input video signal is removed and at the same time the time base is expanded by only just 1/X. Therefore, the original video signal shown in FIG. 8, E, can be reproduced with high fidelity. In this case, it is necessary to remove the horizontal sync signal HS and the burst signal BS which are included in the input video signal However, by setting the delay time of the MMV 27 so as to include the burst signal BS as shown by $\tau_0'$ in FIG. 4, G, the signal for only the video information period (periods of A' and B in FIG. 4, A) excluding the horizontal sync signal HS and burst signal BS is written into the memory 2 and read out therefrom. Therefore, a desired original video signal of which the horizontal sync signal HS and the burst signal BS were removed can be obtained from D/A converter 3. Thus, in this case, it is apparent that there is no need to use the sync insert circuit 800 in particular.

In the embodiment of FIG. 3, the case where the reference clock ($f_1$) is individually generated by the crystal oscillator 21 and the reference sync signal (RCS) is formed by the RSS generator 700 in the apparatus has been shown. However, to synchronize this reference sync signal with the reference sync signal from the outside, a reference clock similar to the above may be obtained using a PLL circuit shown in FIG. 9. This constitution is also included in the spirit of the invention.

Figure 9:
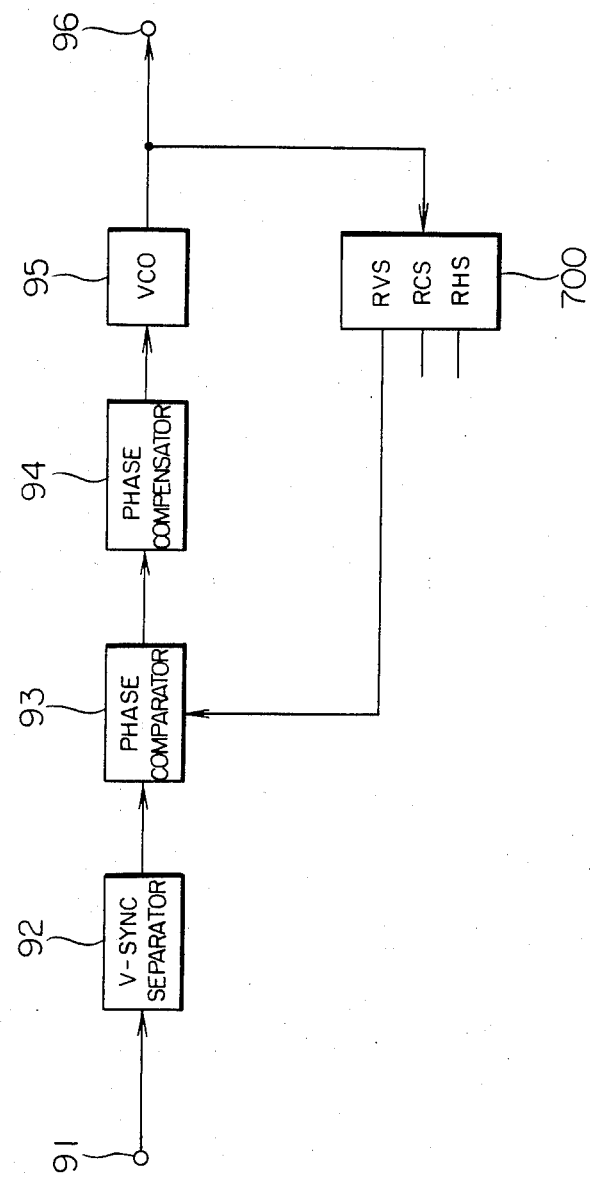
FIG. 9 is a block diagram of an embodiment in which a reference synchronizing signal generator 700 in the time base correcting apparatus of FIG. 3 is connected to an external synchronizing signal.

Practically speaking, in FIG. 9, numeral 700 denotes the same reference synchronizing signal generator as that shown i FIG. 3 and is designated by the same numeral. The RSS generator 700 generates the reference sync signal RCs, reference vertical sync signal RVS, and reference horizontal sync signal (read start pulse) RHS. An output clock from a voltage controlled oscillator (VCO) 95 is supplied to an input of the RSS generator 700. The reference sync signal from the outside is inputted to an input terminal 91 and the vertical sync signal is separated from the input reference sync signal by a vertical synchronizing separator (V-sync separator) 92 and outputted. An external reference vertical sync signal from the V-sync separator 92 and an internal reference vertical sync signal RVS from the RSS generator 700 are phase compared by a phase comparator 93. A phase difference voltage corresponding to the phase difference therebetween is outputted from the phase comparator 93 and is supplied as a control voltage of the VCO 95 through a phase compensator 94. The PLL circuit is constituted by the above circuits. The internal reference vertical sync signal RVS from the RSS generator 700 is phase synchronized with the reference vertical sync signal from the outside. An output of the same frequency ($f_1$) as that of the reference clock from the crystal oscillator 21 in FIG. 3 is derived from the VCO 95 and is outputted from a terminal 96.

The use of the VCO 95 based on the embodiment of FIG. 9 in place of the crystal oscillator 21 in FIG. 3 enables the time base correcting apparatus to be made operative insynchronism with the external signal.

Figure 10:
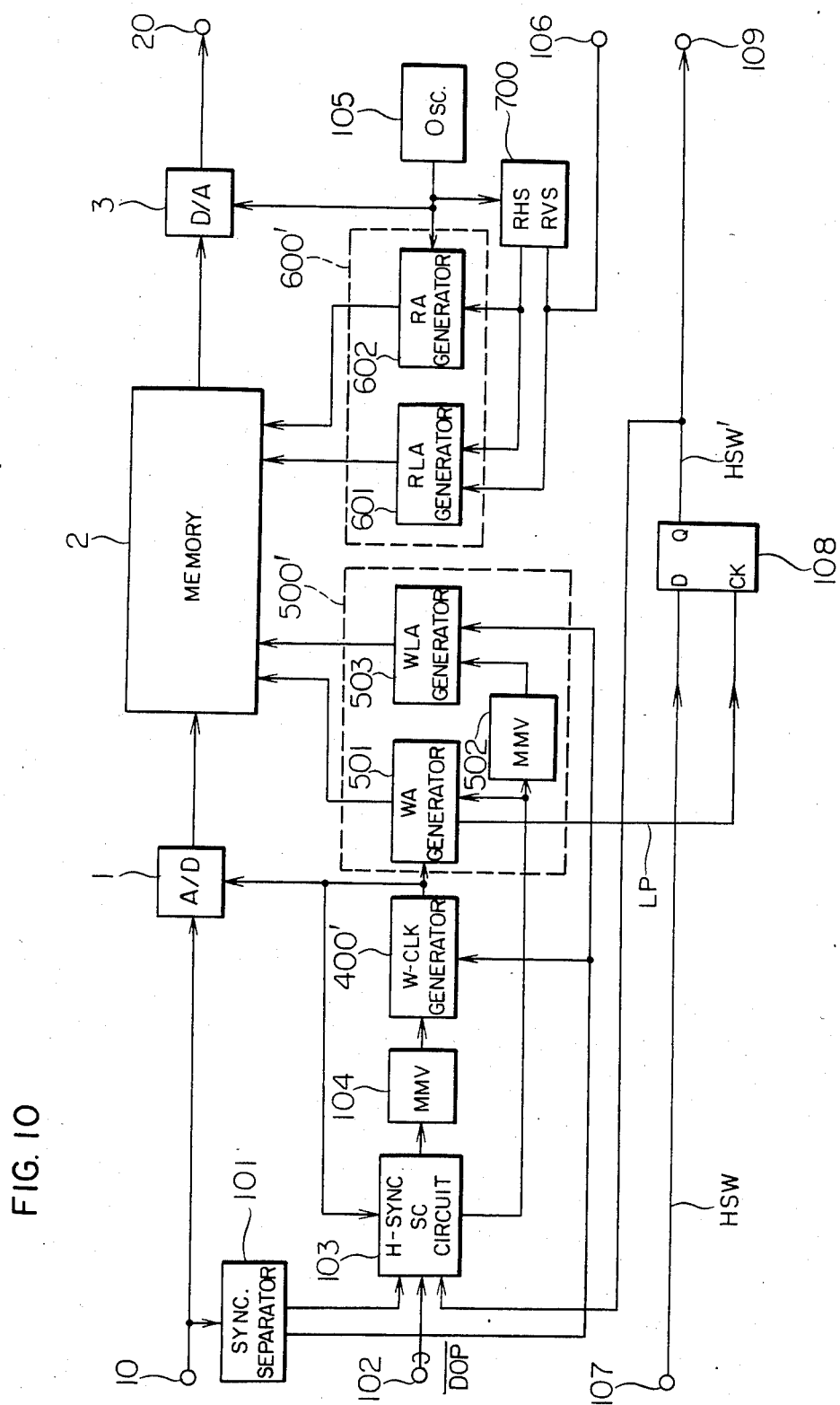
FIG. 10 is a block diagram showing another embodiment of an apparatus for correcting a time base of a video signal according to the invention.

With reference to FIG. 10 and subsequent drawings, a detailed explanation will then be made with respect to the case where the present invention is applied to a time base error correcting circuit of a helical scan type VTR of the segment recording system as another embodiment of the invention. FIG. 10 shows a whole arrangement of the time base error correcting circuit. In the diagram, the same parts and components as those shown in FIG. 3 are designated by the same reference numerals. The reproduced video signal which is inputted from the terminal 10 is inputted to a sync separator 101 and the A/D converter 1. The sync separator 101 has an integrated constitution of the H-sync separator 11 and V-sync separator 16 in FIG. 3 and separates and outputs the horizontal sync information and vertical sync information. Numeral 103 denotes a separating/ correcting circuit of the horizontal sync information (H-sync SC circuit) of a circuit arragement peculiar to the embodiment. The H-sync SC circuit 103 separates and corrects the horizontal sync information and will be explained in detail hereinafter with reference to FIG. 11. The horizontal sync informaiton, a dropout singal ($\overline{DOP}$) which is inputted from a terminal 102, an output of a D-type flip-flop 108, and a signal based on a write clock from a W-CLK generator 400' are inputted to SC circuit 103. An MMV 104 corresponds to the MMV 12 in FIG. 3. It is possible to consider that the W-CLK generator 400' is equivalent to the circuit in which the H-sync separator 11, MMV 12, and V-sync separator 16 were removed from the W-CLK generator 400 in FIG. 3 and an AND circuit to get AND of the output of the frequency multiplier 60 and the inverted output of the latch circuit 28 was added to the output terminal of the frequency multiplier 60.

Figure 11:
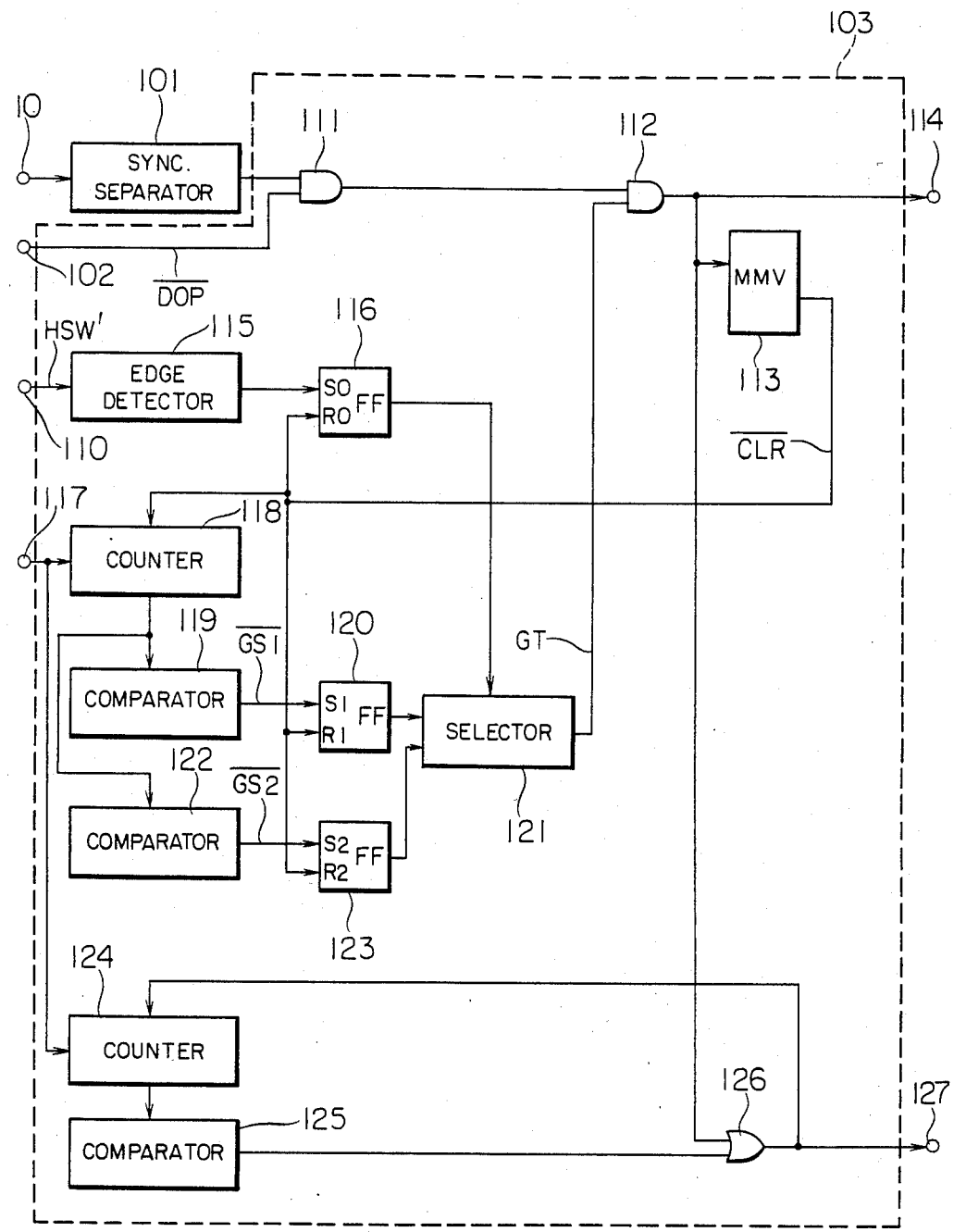
FIG. 11 is a circuit block diagram showing a practical embodiment of a separating/correcting circuit of a horizontal synchronizing signal in the embodiment of FIG. 10.
Figure 12:
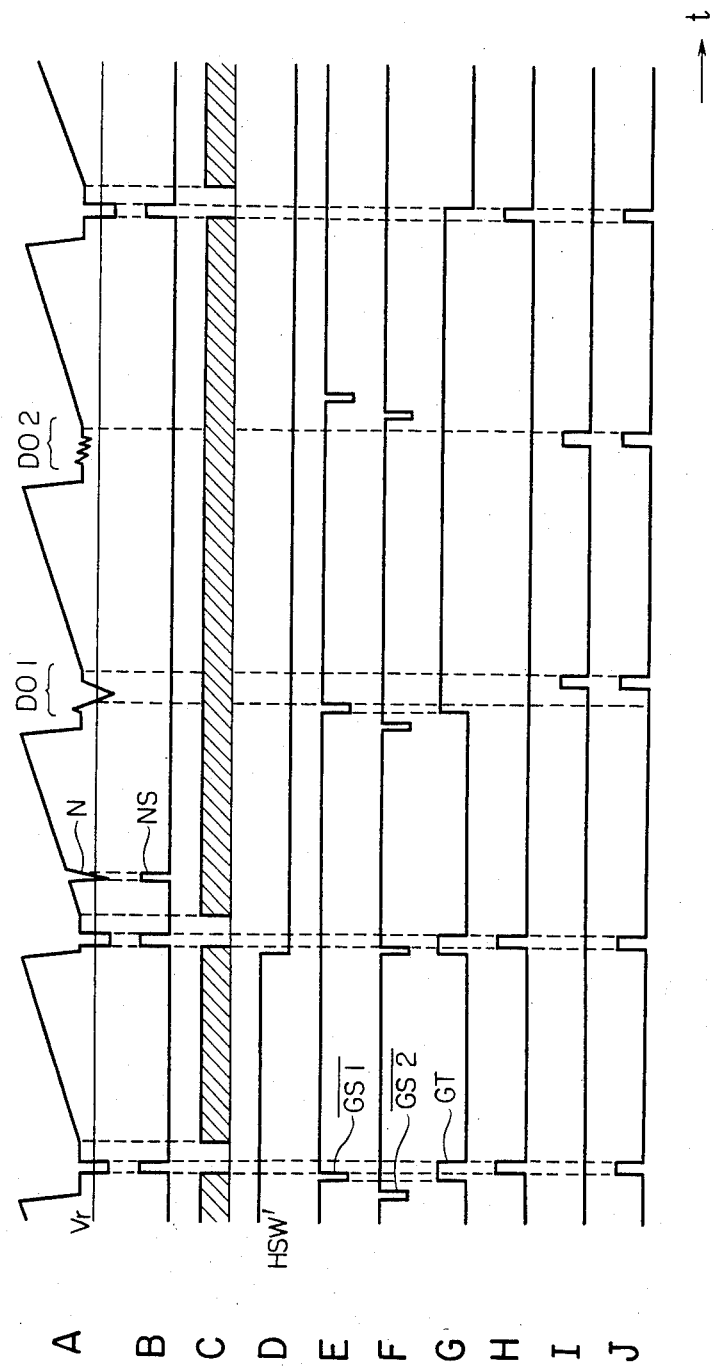
FIG. 12, A to J, is a waveform diagram showing operation waveforms in the main part of the separating/correcting circuit of the horizontal sync signal shown in FIG. 11.

FIG. 11 shows the H-sync SC circuit 103. FIG. 12, A to J, is a diagram showing waveforms in the main part of the SC circuit 103. In FIG. 11, the reproduced video signal (FIG. 12, A) inputted form the terminal 10 is inputted to the sync separator 101. The horizontal sync signal is amplitude compared with a predetermined threshold value $V_r$ and the reproduced horizontal sync signal (FIG. 12, B) is outputted. The dropout signal ($\overline{DOP}$) from a dropout detecting circuit (not shown) is inputted to the terminal 102. The reproduced horizontal sync signal and $\overline{DOP}$ signal are inputted to an AND circuit 111. Thus, the AND circuit 111 is closed for the dropout periods and $D_{01}$ and $_{02}$ in FIG. 12, A), so that the noise due to the dropout for the periods of $D_{01}$ and $D_{02}$ is not outputted. Although the noise (N) in FIG. 12, A, is also a kind of dropout, the generation width of this noise N is very short and the $\overline{DOP}$ signal is not outputted, so that the noise N is not removed by the AND circuit 111 (this noise N is indicated as a pulse NS in FIG. 12, B).

The reproduced horizontal sync signal shown in FIG. 12, B, as an output signal of the AND circuit 111 is further inputted to one input terminal of an AND circuit 112. A signal which becomes an "H" level just before the position where the horizontal sync signal exists in accordance with the periodicity of the horizontal sync signal is inputted to the other input terminal of the AND circuit 112. Thus, only the reproduced horizontal sync signal existing at the normal position is outputted from the AND circuit 112. In other words, the pulse NS is removed. The gated horizontal sync signal as the output signal of the AND circuit 112 is outputted from a terminal 114.

The horizontal sync signal which is outputted from the terminal 114 is sent to the W-CLK generator 400' through the MMV 104 in FIG. 10. The W-CLK generator 400' generates the clock signal whose phase is momentarily synchronized with the video signal on the basis of the horizontal sync signal and executes the time base correcting process of the video signal on the basis of this clock signal in the same manner as mentioned in detail above. The time base is corrected using only the normal sync signal obtained through the AND circuits 111 and 112 as a reference, so that the reliability can be remarkably improved.

Returning to FIG. 11, a circuit to generate a gate signal (GT) which is inputted to the other input terminal of the AND circuit 112 will be described. An output of the W-CLK generator 400' (output of the added AND circuit (not shown), refer to FIG. 12, C) is inputted to a terminal 117. This clock signal is inputted to counters 118 and 124. The counter 118 is initially set by a clear siignal ($\overline{CLR}$) from an MMV 113 which is triggered by the trailing edge of the output of the AND circuit 112. Thereafter, the counter 118 starts to count the clock signal and a count value of the counter 118 is compared with set values in comparators 119 and 122. The set value of the comparator 119 is set (FIG. 12, F) such that a gate start signal ($\overline{GS1}$) is outputted immediately before the next horizontal sync signal. The gate start signal ($\overline{GS1}$) is inputted to an $S_1$ terminal of a flip-flop 120, so that the output state of the flip-flop 120 is set at an "H" level. An output signal of the flip-flop 120 is used as the gate signal (GT) of the AND circuit 112 through a selector 121. Namely, since the gate signal (GT) is at an "H" level immediately before the normal horizontal sync signal from the AND circuit 111 is inputted, only the normal horizontal sync signal (FIG. 12, H) gated by the AND circuit 112 is outputted to the output terminal 114 and inputted to the MMV 113. Thus, the counter 118 is cleared only in the case where the normal horizontal sync signal is outputted. The clear signal ($\overline{CLR}$) is also inputted to an $R_1$ terminal of the flip-flop 120 and an output thereof is immediately inverted and becomes an "L" level after the gated horizontal sync signal was detected. Therefore, the gate signal becomes an "H" level just before the normal horizontal sync signal is inputted and then becomes an "L" level immediately after the normal H-sync signal was detected. Namely, the pulse NS erroneously separted shown in FIG. 12, B, is not outputted to the output terminal of the AND circuit 112 since the gate signal is at an "L" level.

On the other hand, the skew occurs due to the extension or contraction or the like of the tape when the head is switched, so that the time interval of the horizontal sync signal is extended or reduced. In the case where the time interval of the horizontal sync signal is reduced, when the gate signal (GT) is generated at the timing set by the comparator 119, the reproduced H-sync signal is reproduced before the gate signal (GT) becomes an "H" level, so that the normal horizontal sync signal drops out. Therefore, the set value of the comparator 122 is set so as to generate the precedent gate signal in accordance with the presumed skew amount. The count value of the counter 118 is compared with the set value of the comparator 122. When they coincide, a signal ($\overline{GS2}$) which is precedent to the gate start signal ($\overline{GS1}$) is outputted from the comparator 122 (FIG. 12, F). The gate start signal ($\overline{GS2}$) is inputted to an S$_2$ terminal of a flip-flop 123, so that an output of the flip-flop 123 is set at an "H" level.

A head switching signal HSW' (FIG. 12, D) inputted from a terminal 110 is sent to an edge detector 115 and an edge signal indicative of the head switching position is outputted. This edge signal is inputted to an S$_0$ terminal of a flip-flop 116 and an output thereof is set at an "H" level. The output of the flip-flop 116 is inputted as a control signal to a control terminal of the selector 121. An output of the flip-flop 120 is selected as the gate signal (GT) when the control signal just after the head was switched is at an "H" level due to the control signal. Therefore, even if the normal horizontal sync signal is precedent due to the skew, it is detected without being removed by the AND circuit 112. The clear signal (CLR) is also inputted to respective reset terminals R$_0$ and R$_2$ of the flip-flops 116 and 123, so that the gate signal (GT) becomes an "L" level immediately after the normal H-sync signal was detected, and at the same time the control signal also becomes an "L" level. Therefore, the output of the flip-flop 120 is selected and outputted as the gate signal (GT) in a manner similar to the above after the head was switched and the normal H-sync signal was separated.

As described above, the period when the AND circuit 112 is open can be set to the necessary and sufficient period. Only the normal horizontal sync information is transmitted for the period when the AND circuit 112 is open. The AND circuit 112 is closed for the other period, thereby making it possible to prevent the erroneous detection due to the noise (for example, N in FIG. 12, A) or the like. Further, since the clock signal whose phase is synchronized with the reproduced video signal is used as the clock signal to generate the gate signal (GT), there is no need to consider the digitization error of one clock which is caused when the clock whose phase is not synchronized with the reproduced video signal is used. Thus, the period when the AND circuit 112 is open can be extremely reduced and the normal horizontal sync signal can be protected with a high degree of accuracy, thereby making it possible to remarkably increase the reliability of the H-sync SC circuit 103. In particular, what is called a spike-like signal of a short perod is likely to be separated as the sync information due to the noise immediately before the H-sync information. Therefore, the present invention can present a large effect of high accurate protection.

An explanation will then be made with respect to the correcting method in the case where the H-sync signal dropped out due to the dropout or the like, namely, in the case where the signal dropped out from the normal position of the reproduced H-sync information.

Since no H-sync signal exists at the normal position of the reproduced H-sync information, even if the gate signal (GT) becomes an "H" level, the H-sync signal is not outputted from the AND circuit 112. Therefore, the flip-flops 120 and 123 or 116 are not reset and the gate signal (GT) is held at an "H" level. When the next sync information is detected and inputted, the H-sync signal can be outputted from the AND circuit 112.

In addition, when the horizontal sync signal dropped out, the gated H-sync signal is not outputted, so that the clock signal is continuously outputted for the horizontal blanking period as well without being interrupted (FIG. 12, C) as shown by the dropout periods D$_{01}$ and D$_{02}$ in FIG. 12, A. This will be obviously understood since the output of the latch circuit 28 in FIG. 3 is at an "L" level. The clock signal inputted from the terminal 117 is counted by the counter 124. A count output of the counter 124 is inputted to a comparator 125. The comparator 125 compares the count value of the counter 124 with a set value in the comparator 125. When they coincide, a correction signal (FIG. 12, I) is outputted. The set value in the comparator 125 s set so that the correction signal is outputted at a predetermined position only when the H-sync information dropped out. The correction signal and the gated H-sync signal are inputted to an OR circuit 126. The corrected H-sync signal (FIG. 12, J) without any dropout of the sync information is outputted for the horizontal scan period due to the normal sync signal and the correction signal compensated at the time of the dropout.

The counter 124 is cleared by the corrected H-sync signal. When no H-sync information drops out, the counter 124 is cleared on the basis of the gated H-sync signal from the AND circuit 112 within the horizontal blanking period. In the case of the dropout of the H-sync information, the counter 124 is cleared by the correction signal from the comparator 125.

Figure 13:
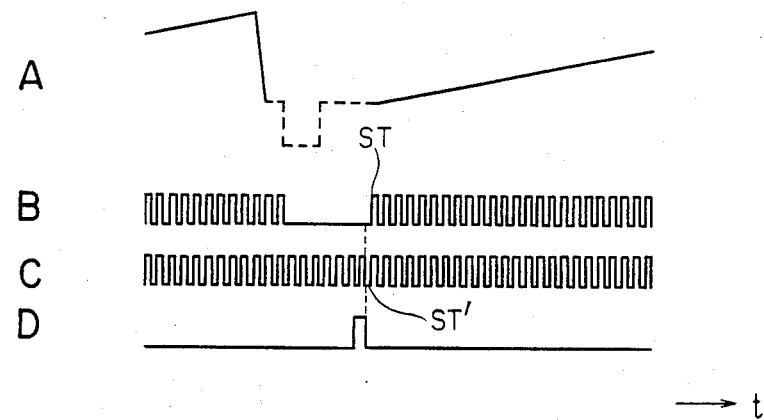
FIG. 13, A to D, is a waveform diagram for explaining the operation of the separating/correcting circuit of the horizontal sync signal shown in FIG. 11.

The position where the correction signal is generated will then be described with reference to the waveforms in FIG. 13, A to D. FIG. 13, A, shows the waveform in which the horizontal blanking period of the reproduced video signal was enlarged FIG. 13, B and C, shows the waveforms of the clock signal within the horizontal blanking period. FIG. 13, B, shows the waveform when no H-sync signal is outputted from the AND circuit 112. FIG. 13, C, shows the waveform when the H-sync signal is not outputted due to the dropout or the like. FIG. 13, D, shows the waveform of the correction signal which is outputted when the H-sync signal dropped out. As shown in FIG. 13, the generation position of the correction signal is set to the position just before the clock signal (ST' in FIG. 13, C) corresponding to the position (St in FIG. 13, B) where the clock signal is started when the normal H-sync information was detected. Namely, the correction signal is outputted such that the counter 124 starts counting from the position of ST'.

By setting the comparator 125 as described above, even if the H-sync signal continuously dropped out, the correction signal can be outputted at the same position. Therefore, if the time base error correction, dropout correction, and other signal processes are performed using the correction signal as a reference, the signal processes can be carried out without any influence by the dropout of the synchronizing information.

The embodiment shown in FIG. 11 further has a feature such that a self-return capability is presented in the case where the synchronizing protection error occurs. Such as at the start of the VTR or the like, when the servo system is not in the stationary state yet, a tracking deviation or the like occurs and the reproduction level is insufficient and the S/N ratio of the reproduced video signal is very bad. In this state, the output of the H-sync SC circuit 103 is frequently erroneously detected due to the dropout of the H-sync information or the noise. Even if this erroneously detected signal is once erroneously outputted as the normal sync information from the AND circuit 112, the gate signal (GT) becomes an "H" level after an expiration of about one horizontal scan period and the AND circuit 112 is again opened to again receive the signal from the AND circuit 111. The above operations are repeated. Thus, the normal H-sync information can be finally detected. As described above, even if the erroneous signal was once gated, the self-return capability functions and the correction signal is not continuously outputted in the erroneous state.

The whole constitution of the time base error correcting circuit for use of the helical scan type VTR of the segment recording system shown in FIG. 10 will be again described. The head switching signal (HSW) based on the rotational phase of the head is inputted to a terminal 107 and is sent to the D-type flip-flop 108. The D-type flip-flop latches the head switching signal (HSW) and adjusts the timing as will be explained in detail hereinafter. Thereafter, the foregoing head switching signal (HSW') is outputted from a Q terminal to the H-sync SC circuit 103. The gated H-sync signal from the SC circuit 103 described in detail before is delayed by the MMV 104 and its output is sent to the WCLK generator 400'. The write clock generated from the W-CLK generator 400' is sent to the A/D converter 1 and a write address (WA) controller 500'. In this embodiment, the WA controller 500' is constituted by a WA generator 501, an MMV 502, and a write line address (WLA) generator 503. The memory 2 consists of a plurality of memory cells each having a memory capacity of the unit of the horizontal scanning line. The memory location in one memory cell is determined by a write address which is generated from the WA generator 501 by counting the write clock. Each memory cell is selected by an output of the WLA generator 503.

In the embodiment, the signal indicative of result of AND of the output of the frequency multiplier 60 in FIG. 3 and the inverted output of the latch circuit 28 is used as the write clock from the W-CLK generator 400'. Therefore, in the case where the H-sync information dropped out as shown in the periods $D_{01}$ and $D_{02}$ in FIG. 12, A, the write clock is continuously outputted without being interrupted for the horizontal blanking period as well. The WA generator 501 is controlled using the corrected H-sync signal from an output terminal 127 of the H-sync SC circuit 103. When the gated H-sync signal is detected, the write clock is interrupted for the horizontal blanking period. Therefore, the WA generator 501 is cleared by the H-sync signal corrected on the basis of the H-sync signal gated for this period. In the case where the normal H-sync signal dropped out, the WA generator 501 is cleared by the H-sync signal corected on the basis of the compensated correction signal. As already described before, the correction signal is generated immediately before the position ST' indicated in FIG. 13, C. Therefore, even if the normal H-sync signal dropped out, the video signal data can be stored at the normal location in the memory cell of the memory 2.

On the other hand, there is also a case where the video signal after the head was switched is delayed at the head switching position due t the skew, so that the normal H-sync signal is outputted after the correction signal in FIG. 11 was outputted. In this case, the WA generator 501 is again cleared by the normal H-sync information detected later, so that the correct address signal to determine the memory location in the memory cell is outputted. However, since a plurality of H-sync information are outputted within one horizontal scan period, if the corrected H-sync signal is directly counted to produce the line address signal, the memory 2 will be erroneously controlled. To count a plurality of horizontal sync signals within one horizontal scan period as one signal, the corrected H-sync signal is inputted to the MMV 502 and its output signal is inputted to the WLA generator 503. By setting the delay time of the MMV 502 to be shorter than one horizontal scan period, those plurality of H-sync signals can be set to one horizontal sync signal due to the frequency dividing function of the MMV 502. Consequently, the write line address signal is also correctly outputted and the video signal can be stored into the memory 2 without any error.

The vertical sync information separated by the sync separator 101 is also inputted to the WLA generator 503. The WLA generator 503 is reset by the signal based on the V-sync information. The video signal can be written without any error from a predetermined location in the memory 2.

The major portion of the time base error correction ends when the video signal was written into the memory 2. By reading out the video signal from the memory 2 using the stable clock signal, the time base error can be stably corrected.

The method of reading out the video signal from the memory 2 in the embodiment will then be described.

The read clock generated from a reference signal generator 105 is inputted to a read address (RA) controller 600' and the D/A converter 3. The clock signal of the reference signal generator 105 is inputted to the RSS generator 700. The RSS generator 700 generates the stable reference vertical sync signal RVS and reference horizontal sync signal RHS in a manner similar to the embodiment of FIG. 3. The RA controller 600' consists of a read address (RA) generator 602 and a read line address (RLA) generator 601. The signal RHS is inputted to the generators 601 and 602. The RA generator 602 generates an address signal for the memory cell in the memory 2 on the basis of the read clock signal and the signal RHS. The RLA generator 601 is reset by the signal based on the signal RVS. By counting the signal RHS, the RLA generator 601 generates a read line address signal to designate a predetermined memory cell in the memory 2. The read line address signal and read address signal are inputted to the memory 2 and the video signal is read out from the predetermined location in the memory 2. An output of the memory 2 is inputted to the D/A converter 3 and converted into an analog signal. Thereafter, it is outputted from the terminal 20 as the video signal which was time base error corrected.

In the VTR of the segment recording system to which this embodiment is applied, a plurality of head switching points exist within one vertical scan period. When the head is switched within the video signal period to transmit the video signal within the horizontal scan period, the video signal becomes discontinuous due to the skew. To prevent the discontinuous video signal, it is sufficient to switch the head at the front porch within the horizontal blanking period. A method for this purpose will then be described with reference to the block diagram of FIG. 10.

The WA generator 501 counts the write clock from the position which was delayed by a predetermined time from the horizontal sync information and outputs a latch pulse LP to latch the head switching signal at the position corresponding to the front porch of the next line.

The head switching signal (HSW) which is inputted from the terminal 107 is inputted to a data input terminal D of the D-type flip-flop 108. The latch pulse LP which is outputted from the WA generator 501 is inputted to a clock input terminal CK of the flip-flop 108. The head switching signal (HSW') latched at the position corresponding to the front porch is outputted from the output terminal Q of the flip-flop 108. The latched signal HSW' is outputted from a terminal 109 and sent to a video signal processor of the VTR (not shown). The video signals reproduced from the respective heads are switched by the latched head switching signal HSW'. Thus, the video signals are switched at the front porch and the continuous video signal is derived for the video signal period.

On the other hand, the reference V-sync signal RVS from the RSS generator 700 is outputted through a terminal 106 and used as a reference signal of a servo control apparatus (not shown). This servo control apparatus is constituted by a tracking control system to accurately reproduce the signal by controlling the relative phases of the heads and the magnetic tape, and the like in the VTR to which the time base error correcting apparatus based on the embodiment of FIG. 10 is applied. The conventional well-known apparatus may be used as this servo control apparatus. The reference V-sync signal RVS from the terminal 106 is inputted to the servo control apparatus, so that the servo control is performed in a manner such that the input video signal from the terminal 10 is phase synchronized with the signal RVS. Further practically speaking, the servo control is carried out so as to obtain the phase synchronization in the state in which the phase of the reference V-sync signal RVS is time-delayed from the phase of the V-sync information of the input video signal. In this manner, the time base error can be stably corrected without any skew distortion.

Figure 14:
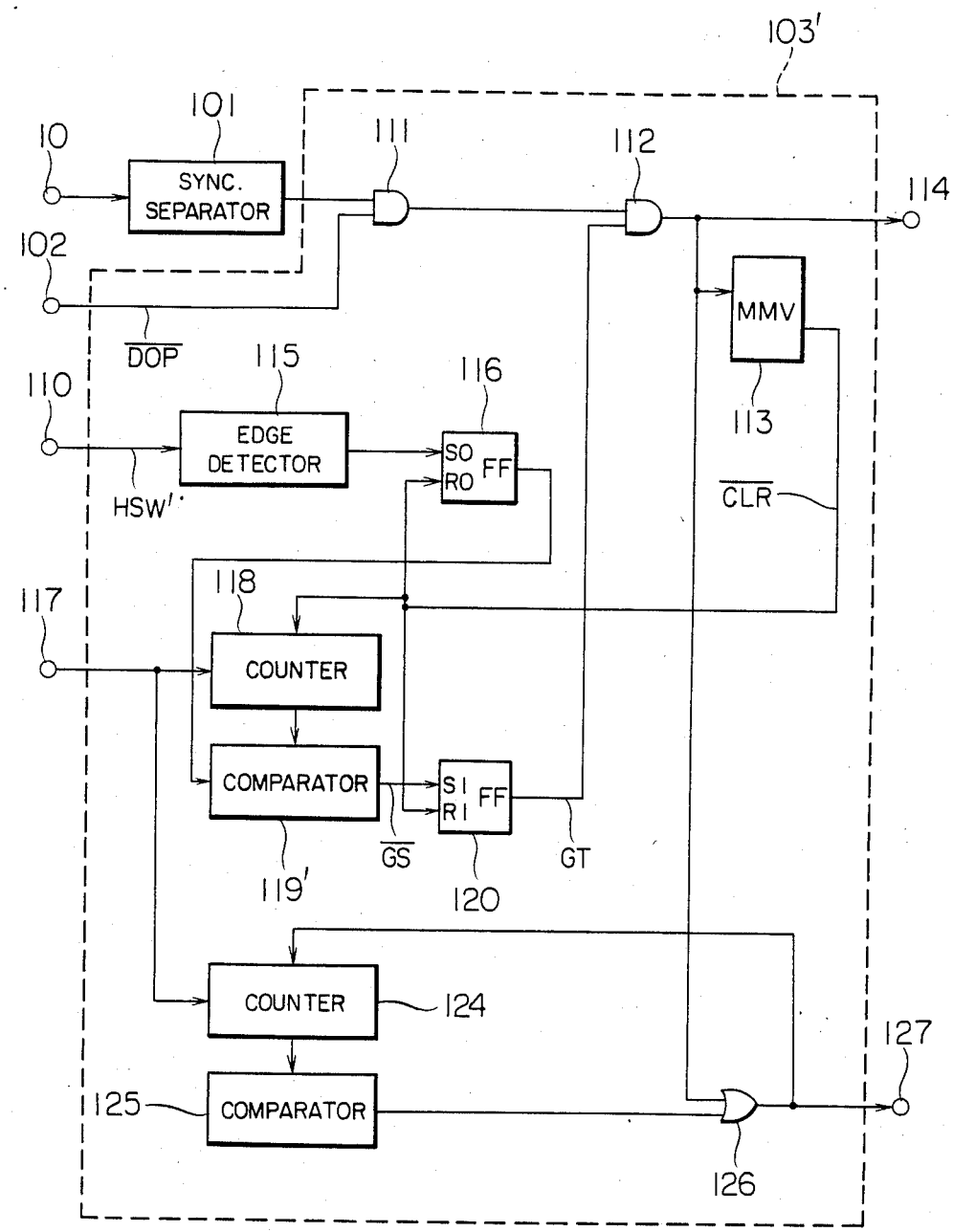
FIG. 14 is a circuit block diagram showing another embodiment of the circuit to separate and correct the horizontal sync signal in FIG. 10.

Other embodiments of the H-sync SC circuit 103 shown in FIG. 11 will then be described with reference to FIGS. 14 and 15. In FIG. 14, the same parts and components as those shown in FIG. 11 are designated by the same reference numerals and their detailed descriptions are omitted. Numeral 103' denotes a circuit to separate and correct the sync information as another embodiment. Numeral 119' is a comparator whose set value can be switched. A feature of this embodiment is that the set value of the comparator 119' is switched by the control signal from the flip-flop 116. Therefore, an output $\overline{GS}$ of the comparator 119' is ordinarily outputted at the timing corresponding to the gate start signal $\overline{GS1}$ shown in FIG. 11. The output GS is outputted at the timing corresponding to the gate start signal $\overline{GS2}$ until the normal horizontal sync signal is outputted after the head was switched. By inputting the signal GS to the S₁ terminal of the flip-flop 120, generating the gate signal GT by the flip-flop 120, and inputting the gate signal GT to the AND circuit 112, the same effect as that in the embodiment shown in FIG. 11 can be obtained.

Figure 15:
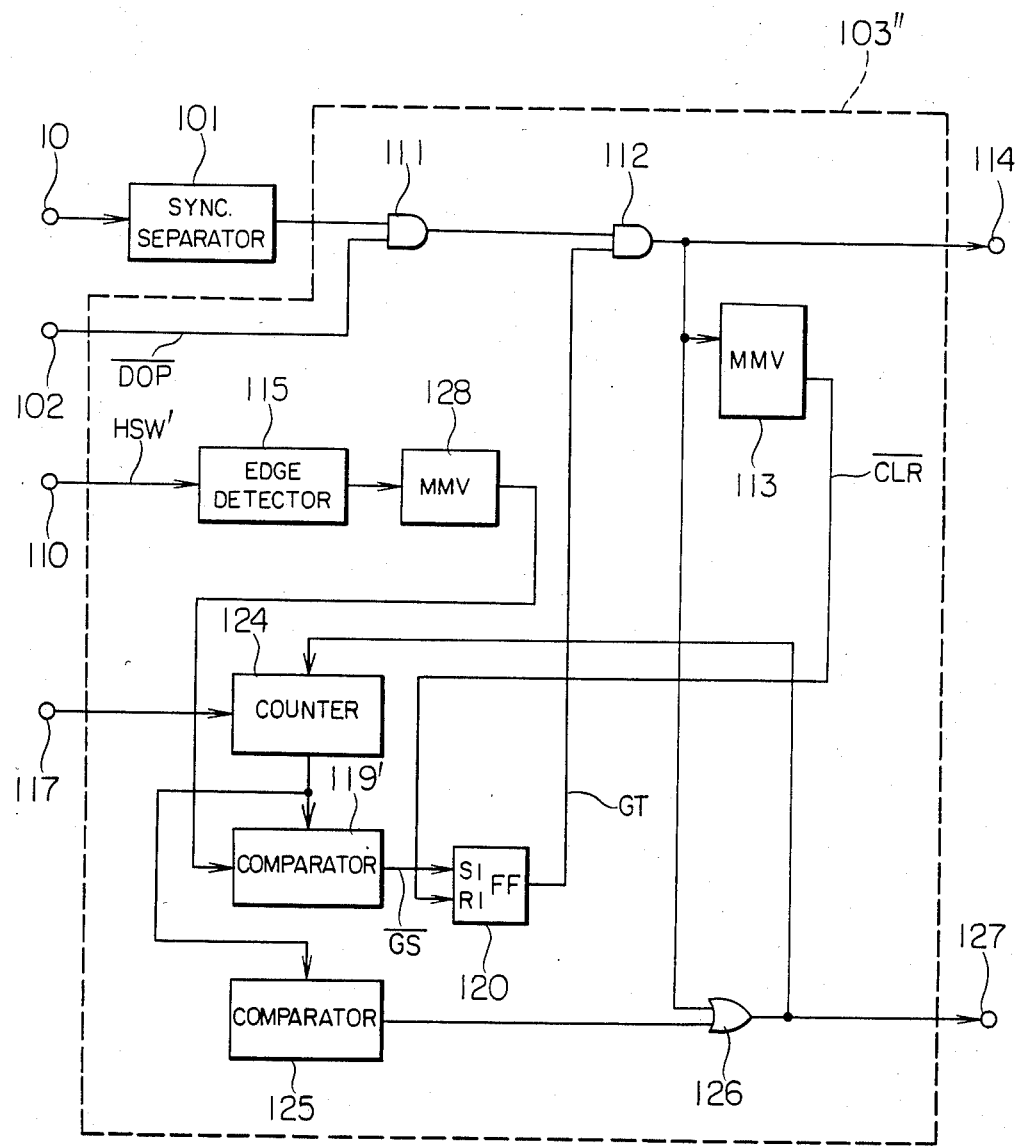
FIG. 15 is a circuit block diagram showing another embodiment of the circuit to separate and correct the horizontal sync signal in FIG. 10.

FIG. 15 is a block diagram showing still another embodiment of the circuit to separate and correct the H-sync information of the invention. FIG. 15 is partially common to FIGS. 11 and 14 and the common parts and components are designated by the same reference numerals and their detailed descriptions are omitted.

In FIG. 15, numeral 128 denotes an MMV and 103" is an H-sync SC circuit in this embodiment.

A feature of the embodiment shown in FIG. 15 is that the MMV 128 is used in place of the flip-flop 116 and the counter 118 is omitted and the output of the counter 124 is inputted to the comparator 119' whose set value can be switched. With this circuit arrangement, the same effect as those in the embodiment shown in FIGS. 11 and 14 can be also obtained.

The delay time of the MMV 128 is set to be one horizontal scan period or shorter and the gate is promptly opened for the first H-sync signal which is reproduced within this period (the gate is opened at the timing of the set value of the comparator 122 in FIG. 11) and thereafter the gate is opened immediately before the H-sync signal (the gate is opened at the timing of the set value of the comparator 119 in FIG. 11).

The counter 124 is cleared by the corrected H-sync signal. When the normal H-sync signal is outputted, the counter 124 is cleared by the signal based on the normal H-sync signal. The same signal as that in the circuit shown in FIG. 14 is outputted from the comparator 119'. In the case where the normal H-sync signal dropped out, the clear signal $\overline{CLR}$ is not outputted from the MMV 113, so that the output GT from the flip-flop 120 is held at an "H" level. When the normal sync information is outputted from the AND circuit 112, the output state of the flip-flop 120 is inverted and becomes an "L" level. As will be understood from the above description, the same effect as those in the embodiments shown in FIGS. 11 and 14 can be also derived with the circuit arrangement shown in FIG. 15.

Although the case where the oscillation of the write clock is stopped for the horizontal blanking period has been described in the embodiments shown in FIG. 11, 14, and 15, it is not always necessary to stop the oscillation. Even in the case where the write clock is continuously generated as well, the invention can be applied in a manner similar to those embodiments. In such a case, the clear signal CLR may be outputted just before the position ST shown in FIG. 13, B. In addition, the output of the frequency multiplier 60 in FIG. 3 may be used as it is as the write clock.

On one hand, the counters 118 and 124 shown in FIG. 11 were cleared by the clear signal $\overline{CLR}$ and by the corrected horizontal sync signal, respectively. However, those counters may be set to predetermined values by those signals. In this case as well, the circuit can operate in a manner similar to the circuit shown in FIG. 11.

As described above, according to the present invention, the time base error and noise included in the video signal can be stably and certainly removed without being influenced by these time base error and noise. At the same time, the function as the time base converting apparatus which can compress or expand the time based of the video signal can be also additionally provided without increasing the circuit scale, resulting in reduction in cost of the apparatus.

On one hand, according to the invention, the gate signal of the H-sync signal is produced using the clock signal synchronized with the video signal. Therefore, the period when the separated H-sync information including the erroneous H-sync information can pass through the gate can be set to the necessary and sufficient period, and the sync detection error can be remarkably reduced. Further, even in the case where the sync information dropped out as well, the correction signal is produced using the clock signal synchronized with the video signal, so that the correction signal can be outputted at the predetermined position synchronized with the video signal and the reliability of the corrected sync information can be improved. The gate is opened or closed in response to the dropout detection signal, so that the erroneous detection due to the noise which is caused when the H-sync signal drops out can be eliminated. Further, in the helical scan type VTR having a plurality of heads, the gate signal which is time precedent is outputted when the head is switched and the dropout of the sync signal due to overprotection can be eliminated. Moreover, when the H-sync information is counted, by delaying the corrected sync information and counting it, there is an effect such that even if a plurality of sync information are generated within one horizontal scan period, they are not erroneously counted, or the like.

We claim:

1. A time base correcting apparatus of a video signal having a memory into which or from which a writing or a readout can be sequentially performed, in which a time base of the video signal is corrected by sampling the video signal in the direction of the time base and sequentially writing into said memory and also sequentially reading the video signal written, said time base correcting apparatus comprising:
    means for separating a burst signal multiplexed to said video signal;
    oscillating means which starts oscillating by receiving said burst signal separated and continues the oscillation for the period when said separated burst signal does not exist;
    reference signal generating means for generating a read clock for said memory;
    phase comparing means for generating a phase difference signal by phase comparing a signal based on an output of said oscillating means and a signal based on an output of said reference signal generating means;
    means for controlling an oscillating frequency of said oscillating means in a negative feedback manner using said phase difference signal for a vertical blanking period of said video signal; and
    means for generating a write clock for said memory from the output of said oscillating means.

2. A time base correcting apparatus according to claim 1, wherein said write clock generating means includes means for frequency multiplying the output of said oscillating means.

3. A time base correcting apparatus according to claim 2, wherein said phase comparing means includes first dividing means for frequency dividing the output from said reference signal generating means and second dividing means for frequency dividing an output from said frequency multiplying means and compares phases of outputs of said first and second dividing means.

4. A time base correcting apparatus according to claim 1, wherein said negative feedback control means includes means for gating said phase difference signal for only the vertical blanking period of said video signal.

5. A time base correcting apparatus according to claim 1, wherein said negative feedback control means includes means for phase compensating said phase difference signal.

6. A time base correcting apparatus according to claim 4, wherein said negative feedback control means includes means for separating a vertical sync signal of said video signal and means for generating a signal indicative of the vertical blanking period from an output of said vertical sync signal separating means, and an output of said generating means is sent to said gate means.

7. A time base correcting apparatus according to claim 6, wherein said negative feedback control means includes means for phase compensating an output of said gate means.

8. A time base correcting apparatus according to claim 1, wherein said reference signal generating means includes a crystal oscillator.

9. A time base correcting apparatus according to claim 8, wherein said reference signal generating means includes third dividing means for frequency dividing an output of said crystal oscillator.

10. A time base correcting apparatus according to claim 1, wherein said burst signal separating means includes a filter for band passing said video signal and a limiter arranged at the post stage of said filter.

11. A time base correcting apparatus according to claim 10, wherein said burst signal separating means includes means for separating a horizontal sync signal of said video signal, means for generating a gate pulse from an output of said horizontal sync signal separating means, and means for gating an output of said limiter by said gate pulse.

12. A time base correcting apparatus according to claim 11, wherein said burst signal separating means includes means for inhibiting that said gate pulse is sent to said gate means for the vertical blanking period.

13. A time base correcting apparatus according to claim 1, wherein the oscillating frequency of said oscillating means is equal to the frequency of said burst signal.

14. A time base correcting apparatus according to claim 13, wherein said oscillating means has at least one NAND gate and said separated burst signal is inputted to one input terminal of said NAND gate and an output of said NAND gate is inputted to the other input terminal through at least an inductance, and said other input terminal is grounded by at least a variable capacitor in an AC manner.

15. A time base correcting apparatus according to claim 14, wherein a capacitance value of said variable capacitor is varied in accordance with the output of said negative feedback control means 16. A time base correcting apparatus according to claim 15, wherein a resistor is connected in series to said inductance.

17. A time base correcting apparatus according to claim 11, wherein said horizontal sync signal separating means includes means for comparing said video signal with a predetermined threshold value and means for gating an output of said comparing means by a signal indicative of the dropout period in said video signal.

18. A time base correcting apparatus according to claim 11, wherein said horizontal sync signal separating means includes amplitude comparing means for comparing said video signal with a predetermined threshold value, first count value comparing means for generating a gate pulse when the output of said write clock generating means becomes a first predetermined value, and gate means which is gated on the basis of an output of said first count value comparing means and passes an output of said amplitude comparing means.

19. A time base correcting apparatus according to claim 18, wherein said horizontal sync signal separating means further includes third count value comparing means for generating a correction signal when the output of said write clock generating means becomes a third predetermined value and means for getting OR of said correction signal and the output signal of said gate means and generating a corrected horizontal sync signal.

20. A time base correcting apparatus according to claim 18, wherein said horizontal sync signal separating means further includes second count value comparing means for generating a gate pulse when the output of said write clock generating means becomes a second predetermined value and means for selecting either one of a signal based on the output of said first count value comparing means and a signal based on an output of said second count value comparing means in response to a control signal, and said horizontal sync signal separating means opens or closes said gate means by an output of said selecting means.

21. A time base error correcting apparatus of a video signal in which after the video signal was sequentially written into a memory, said video signal is sequentially read out from said memory, and thereby obtaining the video signal without any time base error, comprising:
means for separating a burst signal which is included in said video signal;
an oscillating means for outputting an oscillating output whose phase is momentarily synchronized with the burst signal separated from said burst signal separating means;
means for generating a reference signal;
means for phase comparing a signal based on the output of said oscillating means and a signal based on an output of said reference signal generating means;
means for controlling an oscillating frequency of said oscillating means using an output of said phase comparing means for a vertical blanking period of said video signal;
means for writing the video signal into said memory using a write clock based on the output of said oscillating means; and
means for reading out the video signal from the memory using a read clock based on the output of said reference signal generating means.

22. A time base error correcting apparatus according to claim 21, further comprising means for separating a horizontal sync signal included in said video signal,
and wherein said video signal writing means includes means for producing a pulse on the basis of the horizontal sync signal from said horizontal sync signal separating means and means for synchronizing the pulse from said producing means by the output from said oscillating means and generating a write start pulse for said memory.

23. A time base error correcting apparatus according to claim 22, wherein said write start pulse generating means of said video signal writing means generates said write start pulse within a horizontal blanking period of said video signal.

24. A time base error correcting apparatus according to claim 21, wherein said oscillating means includes an oscillator which starts oscillating by receiving said separated burst signal and continues said oscillation for a period when said separated burst signal does not exist and a circuit for frequency multiplying an output of said oscillator.

25. A time base error correcting apparatus according to claim 24, wherein said phase comparing means includes first and second dividing means for frequency dividing the output of said reference signal generating means and an output of said frequency multiplier, respec- tively.

26. A time base error correcting apparatus according to claim 25, wherein said video signal reading means includes third dividing means for generating said read clock by frequency dividing the output of said reference signal generating means.

27. A time base error correcting apparatus according to claim 21, wherein frequencies of said write clock and said read clock differ 28. A time base error correcting apparatus according to claim 25, further comprising means for separating a vertical sync signal included in said video signal and generating a signal indicative of the vertical blanking period from said separated vertical sync signal.

29. A time base error correcting apparatus according to claim 28, wherein dividing values of said first and second dividing means are initialized by said means for generating the signal indicative of the vertical blanking period.

30. A time base error correcting apparatus according to claim 24, wherein said oscillator has at least a two-input gate and said separated burst signal is supplied to one input terminal of said gate and an output of said gate is supplied to the other input terminal through an inductance, and said other input terminal is grounded by a capacitor in an AC manner.

31. A time base error correcting apparatus according to claim 30, wherein said capacitor has at least a variable capacitor and a capacitance value thereof is varied by said phase difference signal.

32. A time base error correcting apparatus according to claim 21, further comprising:
means for separating a horizontal sync signal included in said video signal, and
means for generating a pulse indicative of the position of said burst signal in said video signal from an output of said horizontal sync signal separating means,
and wherein said burst signal separating means includes means which receives the pulse indicative of said burst signal position and extracts only a normal burst signal.

33. An apparatus for correcting a time base of a video signal which is reproduced from a magnetic recording-/reproducing apparatus of the helical scan type having a plurality of rotary heads using said plurality of rotary heads, comprising:
means for separating a horizontal sync signal included in said reproduced video signal;
means for separating a burst signal included in said reproduced video signal using a signal based on an output of said horizontal sync signal separating means and said reproduced video signal;
oscillating means for outputting an oscillating output whose phase is momentarily synchronized with said burst signal separated from said burst signal separating means;
means for generating a reference signal;
means for phase comparing a signal based on the output of said oscillating means and a signal based on an output of said reference signal generating means;
means for controlling an oscillating frequency of said oscillating means using an output of said phase comparing means for a vertical blanking period of said reproduced video signal;

a memory into which or from which a writing or a readout can be sequentially performed;

means for writing said reproduced video signal into said memory using a write clock based on the output of said oscillating means; and means for reading said reproduced video signal from said memory using a read clock based on the output of said reference signal generating means.

34. A time base correcting apparatus according to claim 33, wherein said horizontal sync signal separating means has:

means for comparing an amplitude of said reproduced video signal with a predetermined threshold value;

means for gating an output of said amplitude comparing means;

a counter for counting said write clock;

means for initializing a count value of said counter on the basis of an output of said gate means;

means for producing a control signal at a switching timing of said rotary heads in synchronism with the rotation of said rotary heads; and means for generating a gate signal of said gate means on the basis of the count output of said counter and the output from said gate means, and said horizontal sync signal separating means switches the timings based on a first count value of said counter and a second count value different from said first count value on the basis of said control signal and generates said gate signal.

35. A time base correcting apparatus according to claim 34, wherein said horizontal sync signal separating means further has a detector for detecting that the count value of said counter becomes a predetermined value and means for logically adding an output of said detector and the output of said gate means and outputting the corrected horizontal sync signal.

36. An apparatus for correcting a time-base error according to claim 33, wherein said horizontal synchronizing signal separating means includes means for comparing said reproduced video signal with a predetermined threshold value, means for gating the output signal of said comparing means, means for counting said write clock, and means for generating a gate signal of said gating means in response to the output signal of said counting means.

37. An apparatus for correcting a time-base error according to claim 36, wherein said counting means is initially set in response to the output signal of said gating means and generates the output signal when the count value thereof becomes a value corresponding to the position of the horizontal synchronizing signal.

38. An apparatus for correcting a time-base error according to claim 36, further comprising:

means for generating a control signal for exchanging the rotary heads in phase-locked to the rotation of the rotary heads, wherein said counting means is initially set in response to the output signal of said gating means and generates the output signal when the count value thereof becomes a first value corresponding to the position of the horizontal synchronizing signal and a second value being smaller than said first value and said gate signal generating means selects one of said gate signal corresponding to said first signal and said second signal in response to said control signal.

39. An apparatus for correcting a time-base error according to claim 38, wherein said counting means has a counter for counting the write clock, a first comparator for comparing the count value of said counter with said first value and a second comparator for comparing the count value of said counter with said second value.

* * * * *